United States Patent
Kavanagh et al.

(10) Patent No.: US 11,775,495 B2
(45) Date of Patent: *Oct. 3, 2023

(54) DATABASE INDEXING IN PERFORMANCE MEASUREMENT SYSTEMS

(71) Applicant: Chicago Mercantile Exchange Inc., Chicago, IL (US)

(72) Inventors: Kyle Dennis Kavanagh, Chicago, IL (US); José Antonio Acuña-Rohter, Des Plaines, IL (US); David Michael Wong, LaGrange, IL (US)

(73) Assignee: Chicago Mercantile Exchange Inc., Chicago, IL (US)

( * ) Notice: Subject to any disclaimer, the term of this patent is extended or adjusted under 35 U.S.C. 154(b) by 56 days.

This patent is subject to a terminal disclaimer.

(21) Appl. No.: 17/015,184

(22) Filed: Sep. 9, 2020

(65) Prior Publication Data

US 2020/0401570 A1   Dec. 24, 2020

Related U.S. Application Data

(63) Continuation of application No. 15/726,922, filed on Oct. 6, 2017, now Pat. No. 10,803,042.

(51) Int. Cl.
*G06F 16/22* (2019.01)
*G06F 11/30* (2006.01)
(Continued)

(52) U.S. Cl.
CPC ...... *G06F 16/2272* (2019.01); *G06F 11/3072* (2013.01); *G06F 11/3419* (2013.01);
(Continued)

(58) Field of Classification Search
CPC ............ G06F 16/2272; G06F 11/3072; G06F 11/3419; G06F 16/24553; G06F 16/2474; G06F 2201/835; G06F 2201/87
See application file for complete search history.

(56) References Cited

U.S. PATENT DOCUMENTS 6,771,607 B1   8/2004  Russell et al.
7,020,167 B2   3/2006  Russell et al.
(Continued)

FOREIGN PATENT DOCUMENTS

EP   1008938 A2   6/2000
WO   2012/098341   7/2012

OTHER PUBLICATIONS

Extended European Search Report, from EP 18198486.5, dated Dec. 3, 2018, EP.
(Continued)

*Primary Examiner* — Robert W Beausoliel, Jr.
*Assistant Examiner* — Mohammad S Bhuyan
(74) *Attorney, Agent, or Firm* — LEMPIA SUMMERFIELD KATZ LLC

(57) ABSTRACT

A performance measurement indexing system indexes a data store containing data entries indicative of message processing by an application. The application includes a plurality of checkpoints, and the data store contains data logged upon each message traversing the checkpoints in the application. The performance measurement indexing system determines which data entries relate to messages that satisfy a delay condition, and limits queries run on the data store to those data entries, thereby increasing the speed and efficiency with which queries can be serviced.

35 Claims, 12 Drawing Sheets

(51) Int. Cl.
*G06F 11/34* (2006.01)
*G06F 16/2455* (2019.01)
*G06F 16/2458* (2019.01)

(52) U.S. Cl.
CPC .... *G06F 16/2474* (2019.01); *G06F 16/24553* (2019.01); *G06F 2201/835* (2013.01); *G06F 2201/87* (2013.01)

(56) References Cited

U.S. PATENT DOCUMENTS

| | | | |
|---|---|---|---|
| 7,039,610 | B2 | 5/2006 | Morano et al. |
| 7,831,491 | B2 | 11/2010 | Newell et al. |
| 7,853,499 | B2 | 12/2010 | Czupek et al. |
| 7,870,431 | B2 | 1/2011 | Cirne |
| 10,782,990 | B1* | 9/2020 | Suarez ............... G06F 11/301 |
| 2005/0096999 | A1 | 5/2005 | Newell et al. |
| 2005/0203826 | A1 | 9/2005 | Farrell et al. |
| 2005/0289160 | A1* | 12/2005 | Ashwin ............. G06F 16/24547 |
| 2006/0029016 | A1 | 2/2006 | Peles |
| 2008/0177756 | A1 | 7/2008 | Kosche et al. |
| 2008/0306711 | A1 | 12/2008 | Bansal |
| 2009/0257319 | A1* | 10/2009 | Henzler ................. G04F 10/04 327/161 |
| 2010/0125661 | A1* | 5/2010 | Perala ................... H04L 43/106 709/224 |
| 2014/0006243 | A1 | 1/2014 | Boudreault et al. |
| 2015/0073962 | A1 | 3/2015 | Bixby et al. |
| 2015/0120637 | A1 | 4/2015 | Eom et al. |
| 2015/0127513 | A1 | 5/2015 | Studnitzer et al. |
| 2015/0149625 | A1 | 5/2015 | Piro, Jr. |
| 2015/0161727 | A1 | 6/2015 | Callaway et al. |
| 2015/0347268 | A1 | 12/2015 | Garrett et al. |
| 2016/0098697 | A1 | 4/2016 | Dunsmore |
| 2016/0328435 | A1 | 11/2016 | Kavanagh et al. |
| 2017/0310569 | A1* | 10/2017 | Clemm ................. H04L 5/0055 |
| 2018/0032574 | A1 | 2/2018 | Vandenberg |

OTHER PUBLICATIONS

Summons to Attend Oral Proceedings, issued in European Application No. 18198486, dated Nov. 25, 2021, EP.

* cited by examiner

| Identifier | Checkpoint | Timestamp information (ms) |
|---|---|---|
| M1 | 602 | 1 |
| M1 | 608 | 1.5 |
| M2 | 602 | 3 |
| M1 | 610 | 4 |
| M2 | 608 | 4.5 |
| M2 | 610 | 7 |
| M1 | 616 | 10 |
| M2 | 616 | 11 |
| M1 | 618 | 12 |
| M2 | 618 | 13 |
| M1 | 624 | 17 |
| M2 | 624 | 26 |

Fig. 7A

|  | M1 | M2 |
|---|---|---|
| Stage 1 (602, 608) | 0.5 | 1.5 |
| Stage 2 (610, 616) | 6 | 4 |
| Stage 3 (618, 624) | 5 | 13 |

Fig. 7B

| Identifier | Checkpoint | Timestamp information (ms) | Delay Flag |
|---|---|---|---|
| M1 | 602 | 1 | |
| M1 | 608 | 1.5 | |
| M2 | 602 | 3 | |
| M1 | 610 | 4 | x |
| M2 | 608 | 4.5 | |
| M2 | 610 | 7 | x |
| M1 | 616 | 10 | |
| M2 | 616 | 11 | x |
| M1 | 618 | 12 | x |
| M2 | 618 | 13 | x |
| M1 | 624 | 17 | x |
| M2 | 624 | 26 | x |

DATABASE INDEXING IN PERFORMANCE MEASUREMENT SYSTEMS

CROSS REFERENCE TO RELATED APPLICATIONS

This application is a continuation under 37 C.F.R. § 1.53(b) of U.S. patent application Ser. No. 15/726,922 filed Oct. 6, 2017 now U.S. Pat. No. 10,803,042, the entire disclosure of which is incorporated by reference in its entirety and relied upon.

BACKGROUND

Performance measurement systems monitor and record information about the operation of a system, such as by logging the progress of messages through an application or code. Example information that is often logged/recorded by such systems includes data indicative of the occurrence of an event, such as when a processing of a particular message began or was completed by a particular processing stage, and time information about when that event occurred. The logged data may be stored in a data store as the data is collected. The data store may be queried, e.g., during a post-processing phase, by a performance analysis tool to derive performance metrics about the application, e.g., the speed, efficiency, etc. with which the application processed the messages. A high volume data transaction processing system may process, and accordingly record the details for, many messages/transactions. The application performance data becomes more useful as more data is collected/analyzed. However, too many data entries in the data store can drastically increase query response time.

BRIEF DESCRIPTION OF THE DRAWINGS

FIG. 7A depicts an example data store including data entries indicative of message processing in a data transaction processing system, according to some embodiments.

FIG. 7B depicts example message processing latencies for messages processed in a data transaction processing system, according to some embodiments.

FIG. 7C depicts an example indexed data store including data entries indicative of message processing in a data transaction processing system, according to some embodiments.

DETAILED DESCRIPTION

Figure 1:
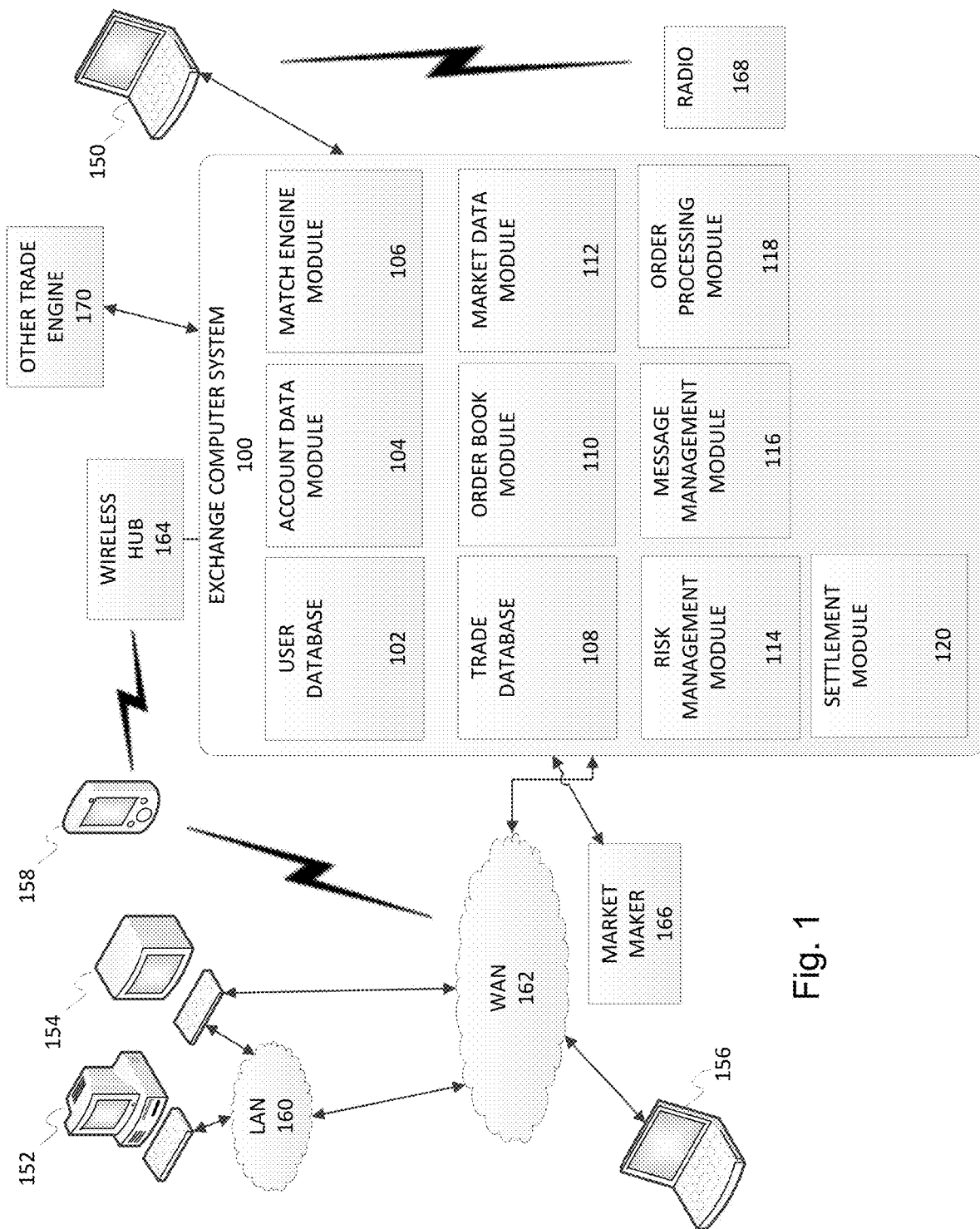
FIG. 1 depicts a computer network system, according to some embodiments.

The disclosed embodiments generally relate to methods and systems for indexing a data store so that the time required to query the data store is reduced. In particular, the disclosed embodiments may be implemented as a performance measurement indexing system that parses a data store storing data entries recorded or logged by a monitoring system, and reduces the dataset retrieved/searched in response to queries on the data store.

A data transaction processing system may include an application that processes messages or transactions. A monitoring system records monitors processing of messages in a data transaction processing system by logging information, i.e., tracer entries, about those messages as they are processed through the application/data transaction processing system, i.e., as they are processed at/through various "checkpoints" in the system.

An application may include a plurality of checkpoints. Checkpoints may be inserted at specified locations or lines in the application code by a developer, e.g., at points of interest in the code. A checkpoint may be associated with a line in the code. A checkpoint's location in the code may be identifiable, e.g., via an identifier for the associated line, or a line number. At each checkpoint, the software code may include a method call to log information in the data store. When a message traverses a checkpoint, the monitoring system logs information about the occurrence of the traversal event by recording data indicative of the message, the checkpoint name, and a timestamp associated with the occurrence of the event.

During a post-processing phase, the performance measurement indexing system determines the latencies associated with various checkpoint pairs, and marks or indicates which areas of the application are associated with the highest latencies, or is congested. For example, the performance measurement indexing system may include a latency detection system that determines whether a portion of a code experienced a higher than expected, or lower than expected, latency. When the data store is queried, e.g., by a performance analysis tool, the performance measurement indexing system enables the performance analysis tool to only retrieve/search the portions of the application that were congested.

The disclosed embodiments improve the speed with which performance analysis tool queries can be performed on the data store, which contains message processing data. The performance measurement indexing system focuses the field of the search to just the portions of the application that are associated with unexpected/undesirable delays.

The disclosed embodiments also improve the efficiency and convenience of the user operation. A user can perform a query and obtain query results quickly because the performance measurement indexing system has already limited the field of the search to the areas that should be of most interest to the performance analysis tool, the areas of the application suffering from unexpected performance delays.

The disclosed embodiments also improve upon the technical field of performance measurement database search and retrieval by formatting the data store for the specific type of tool performing a query on the data store. At least some of the problems solved by the disclosed embodiments are specifically rooted in technology, where a data store collects high-fidelity, granular data for millions of transactions causing exceedingly large data store sizes, which result in time consuming queries, and are solved by the disclosed performance measurement indexing system that determines latencies between combinations of checkpoints during a post-processing phase, before a performance analysis tools runs queries on the data store, and makes the results of the indexing available to the performance analysis tool queries.

Some database indexing methods, which are configured to work with queries to search for all instances of specified keys/values within the database, enable fast responses by generating, ahead of time (e.g., before a query is received), a separate data structure that stores each unique key with pointers to all of the instances of the key, so that when such queries are received, the queries can be answered quickly using the data structure. However, the disclosed embodiments are also applicable to queries that do not request a specific key or value to be searched in the data store. For example, the disclosed embodiments can be implemented to enable faster searching of performance measurement data, where the indexing is not specific to the searched keys/values.

Exchange Computing System

The disclosed embodiments may be implemented in a data transaction processing system that processes data items or objects. Customer or user devices (e.g., client computers) may submit electronic data transaction request messages, e.g., inbound messages, to the data transaction processing system over a data communication network. The electronic data transaction request messages may include, for example, transaction matching parameters, such as instructions and/or values, for processing the data transaction request messages within the data transaction processing system. The instructions may be to perform transactions, e.g., buy or sell a quantity of a product at a range of values defined equations. Products, e.g., financial instruments, or order books representing the state of an electronic marketplace for a product, may be represented as data objects within the exchange computing system. The instructions may also be conditional, e.g., buy or sell a quantity of a product at a given value if a trade for the product is executed at some other reference value. The data transaction processing system may include various specifically configured matching processors that match, e.g., automatically, electronic data transaction request messages for the same one of the data items or objects. The specifically configured matching processors may match, or attempt to match, electronic data transaction request messages based on multiple transaction matching parameters from the different client computers. The specifically configured matching processors may additionally generate information indicative of a state of an environment (e.g., the state of the order book) based on the processing, and report this information to data recipient computing systems via outbound messages published via one or more data feeds.

For example, one exemplary environment where the disclosed embodiments may be desirable is in financial markets, and in particular, electronic financial exchanges, such as a futures exchange, such as the Chicago Mercantile Exchange Inc. (CME).

A financial instrument trading system, such as a futures exchange, such as the Chicago Mercantile Exchange Inc. (CME), provides a contract market where financial instruments, e.g., futures and options on futures, are traded using electronic systems. "Futures" is a term used to designate all contracts for the purchase or sale of financial instruments or physical commodities for future delivery or cash settlement on a commodity futures exchange. A futures contract is a legally binding agreement to buy or sell a commodity at a specified price at a predetermined future time. An option contract is the right, but not the obligation, to sell or buy the underlying instrument (in this case, a futures contract) at a specified price on or before a certain expiration date. An option contract offers an opportunity to take advantage of futures price moves without actually having a futures position. The commodity to be delivered in fulfillment of the contract, or alternatively the commodity for which the cash market price shall determine the final settlement price of the futures contract, is known as the contract's underlying reference or "underlier." The underlying or underlier for an options contract is the corresponding futures contract that is purchased or sold upon the exercise of the option.

The terms and conditions of each futures contract are standardized as to the specification of the contract's underlying reference commodity, the quality of such commodity, quantity, delivery date, and means of contract settlement. Cash settlement is a method of settling a futures contract whereby the parties effect final settlement when the contract expires by paying/receiving the loss/gain related to the contract in cash, rather than by effecting physical sale and purchase of the underlying reference commodity at a price determined by the futures contract, price. Options and futures may be based on more generalized market indicators, such as stock indices, interest rates, futures contracts and other derivatives.

An exchange may provide for a centralized "clearing house" through which trades made must be confirmed, matched, and settled each day until offset or delivered. The clearing house may be an adjunct to an exchange, and may be an operating division of an exchange, which is responsible for settling trading accounts, clearing trades, collecting and maintaining performance bond funds, regulating delivery, and reporting trading data. One of the roles of the clearing house is to mitigate credit risk. Clearing is the procedure through which the clearing house becomes buyer to each seller of a futures contract, and seller to each buyer, also referred to as a novation, and assumes responsibility for protecting buyers and sellers from financial loss due to breach of contract, by assuring performance on each contract. A clearing member is a firm qualified to clear trades through the clearing house.

An exchange computing system may operate under a central counterparty model, where the exchange acts as an intermediary between market participants for the transaction of financial instruments. In particular, the exchange computing system novates itself into the transactions between the market participants, i.e., splits a given transaction between the parties into two separate transactions where the exchange computing system substitutes itself as the counterparty to each of the parties for that part of the transaction, sometimes referred to as a novation. In this way, the exchange computing system acts as a guarantor and central counterparty and there is no need for the market participants to disclose their identities to each other, or subject themselves to credit or other investigations by a potential counterparty. For example, the exchange computing system insulates one market participant from the default by another market participant. Market participants need only meet the requirements of the exchange computing system. Anonymity among the market participants encourages a more liquid market environment as there are lower barriers to participation. The exchange computing system can accordingly offer benefits such as centralized and anonymous matching and clearing.

Electronic Data Transaction Request Messages

As used herein, a financial message, or an electronic message, refers both to messages communicated by market participants to an electronic trading or market system and vice versa. The messages may be communicated using packeting or other techniques operable to communicate information between systems and system components. Some messages may be associated with actions to be taken in the electronic trading or market system. In particular, in one embodiment, upon receipt of a request, a token is allocated and included in a TCP shallow acknowledgment transmission sent back to the participant acknowledging receipt of the request. It should be appreciated that while this shallow acknowledgment is, in some sense, a response to the request, it does not confirm the processing of an order included in the request. The participant, i.e., their device, then sends back a TCP acknowledgment which acknowledges receipt of the shallow acknowledgment and token.

Financial messages communicated to the electronic trading system, also referred to as "inbound" messages, may include associated actions that characterize the messages, such as trader orders, order modifications, order cancellations and the like, as well as other message types. Inbound messages may be sent from client devices associated with market participants, or their representatives, e.g., trade order messages, etc., to an electronic trading or market system. For example, a market participant may submit an electronic message to the electronic trading system that includes an associated specific action to be undertaken by the electronic trading system, such as entering a new trade order into the market or modifying an existing order in the market. In one embodiment, if a participant wishes to modify a previously sent request, e.g., a prior order which has not yet been processed or traded, they may send a request message comprising a request to modify the prior request. In one exemplary embodiment, the incoming request itself, e.g., the inbound order entry, may be referred to as an iLink message. iLink is a bidirectional communications/message protocol/ message format implemented by the Chicago Mercantile Exchange Inc.

Financial messages communicated from the electronic trading system, referred to as "outbound" messages, may include messages responsive to inbound messages, such as confirmation messages, or other messages such as market update messages, quote messages, and the like. Outbound messages may be disseminated via data feeds.

Financial messages may further be categorized as having or reflecting an impact on a market or electronic marketplace, also referred to as an "order book" or "book," for a traded product, such as a prevailing price therefore, number of resting orders at various price levels and quantities thereof, etc., or not having or reflecting an impact on a market or a subset or portion thereof. In one embodiment, an electronic order book may be understood to be an electronic collection of the outstanding or resting orders for a financial instrument.

For example, a request to place a trade may result in a response indicative of the trade either being matched with, or being rested on an order book to await, a suitable counter-order. This response may include a message directed solely to the trader who submitted the order to acknowledge receipt of the order and report whether it was matched, and the extent thereof, or rested. The response may further include a message to all market participants reporting a change in the order book due to the order. This response may take the form of a report of the specific change to the order book, e.g., an order for quantity X at price Y was added to the book (referred to, in one embodiment, as a Market By Order message), or may simply report the result, e.g., price level Y now has orders for a total quantity of Z (where Z is the sum of the previous resting quantity plus quantity X of the new order). In some cases, requests may elicit a non-impacting response, such as temporally proximate to the receipt of the request, and then cause a separate market-impact reflecting response at a later time. For example, a stop order, fill or kill order (FOK), also known as an immediate or cancel order, or other conditional request may not have an immediate market impacting effect, if at all, until the requisite conditions are met.

An acknowledgement or confirmation of receipt, e.g., a non-market impacting communication, may be sent to the trader simply confirming that the order was received. Upon the conditions being met and a market impacting result thereof occurring, a market-impacting message may be transmitted as described herein both directly back to the submitting market participant and to all market participants (in a Market By Price "MBP" e.g., Aggregated By Value ("ABV") book, or Market By Order "MBO", e.g., Per Order ("PO") book format). It should be appreciated that additional conditions may be specified, such as a time or price limit, which may cause the order to be dropped or otherwise canceled and that such an event may result in another non-market-impacting communication instead. In some implementations, market impacting communications may be communicated separately from non-market impacting communications, such as via a separate communications channel or feed.

It should be further appreciated that various types of market data feeds may be provided which reflect different markets or aspects thereof. Market participants may then, for example, subscribe to receive those feeds of interest to them. For example, data recipient computing systems may choose to receive one or more different feeds. As market impacting communications usually tend to be more important to market participants than non-impacting communications, this separation may reduce congestion and/or noise among those communications having or reflecting an impact on a market or portion thereof. Furthermore, a particular market data feed may only communicate information related to the top buy/sell prices for a particular product, referred to as "top of book" feed, e.g., only changes to the top 10 price levels are communicated. Such limitations may be implemented to reduce consumption of bandwidth and message generation resources. In this case, while a request message may be considered market-impacting if it affects a price level other than the top buy/sell prices, it will not result in a message being sent to the market participants.

Examples of the various types of market data feeds which may be provided by electronic trading systems, such as the CME, in order to provide different types or subsets of market information or to provide such information in different formats include Market By Order or Per Order, Market Depth (also known as Market by Price or Aggregated By Value to a designated depth of the book), e.g., CME offers a 10-deep market by price feed, Top of Book (a single depth Market by Price feed), and combinations thereof. There may also be all manner of specialized feeds in terms of the content, i.e., providing, for example, derived data, such as a calculated index.

Market data feeds may be characterized as providing a "view" or "overview" of a given market, an aggregation or a portion thereof or changes thereto. For example, a market data feed, such as a Market By Price ("MBP") feed, also known as an Aggregated By Value ("ABV") feed, may convey, with each message, the entire/current state of a market, or portion thereof, for a particular product as a result of one or more market impacting events. For example, an MBP message may convey a total quantity of resting buy/ sell orders at a particular price level in response to a new order being placed at that price. An MBP message may convey a quantity of an instrument which was traded in response to an incoming order being matched with one or more resting orders. MBP messages may only be generated for events affecting a portion of a market, e.g., only the top 10 resting buy/sell orders and, thereby, only provide a view of that portion. As used herein, a market impacting request may be said to impact the "view" of the market as presented via the market data feed.

An MBP feed may utilize different message formats for conveying different types of market impacting events. For example, when a new order is rested on the order book, an MBP message may reflect the current state of the price level to which the order was added, e.g., the new aggregate quantity and the new aggregate number of resting orders. As can be seen, such a message conveys no information about the individual resting orders, including the newly rested order, themselves to the market participants. Only the submitting market participant, who receives a separate private message acknowledging the event, knows that it was their order that was added to the book. Similarly, when a trade occurs, an MBP message may be sent which conveys the price at which the instrument was traded, the quantity traded and the number of participating orders, but may convey no information as to whose particular orders contributed to the trade. MBP feeds may further batch reporting of multiple events, i.e., report the result of multiple market impacting events in a single message.

Alternatively, a market data feed, referred to as a Market By Order ("MBO") feed also known as a Per Order ("PO") feed, may convey data reflecting a change that occurred to the order book rather than the result of that change, e.g., that order ABC for quantity X was added to price level Y or that order ABC and order XYZ traded a quantity X at a price Y. In this case, the MBO message identifies only the change that occurred so a market participant wishing to know the current state of the order book must maintain their own copy and apply the change reflected in the message to know the current state. As can be seen, MBO/PO messages may carry much more data than MBP/ABV messages because MBO/PO messages reflect information about each order, whereas MBP/ABV messages contain information about orders affecting some predetermined value levels. Furthermore, because specific orders, but not the submitting traders thereof, are identified, other market participants may be able to follow that order as it progresses through the market, e.g., as it is modified, canceled, traded, etc.

An ABV book data object may include information about multiple values. The ABV book data object may be arranged and structured so that information about each value is aggregated together. Thus, for a given value V, the ABV book data object may aggregate all the information by value, such as for example, the number of orders having a certain position at value V, the quantity of total orders resting at value V, etc. Thus, the value field may be the key, or may be a unique field, within an ABV book data object. In one embodiment, the value for each entry within the ABV book data object is different. In one embodiment, information in an ABV book data object is presented in a manner such that the value field is the most granular field of information.

A PO book data object may include information about multiple orders. The PO book data object may be arranged and structured so that information about each order is represented. Thus, for a given order O, the PO book data object may provide all of the information for order O. Thus, the order field may be the key, or may be a unique field, within a PO book data object. In one embodiment, the order ID for each entry within the PO book data object is different. In one embodiment, information in a PO book data object is presented in a manner such that the order field is the most granular field of information.

Thus, the PO book data object may include data about unique orders, e.g., all unique resting orders for a product, and the ABV book data object may include data about unique values, e.g., up to a predetermined level, e.g., top ten price or value levels, for a product.

It should be appreciated that the number, type and manner of market data feeds provided by an electronic trading system are implementation dependent and may vary depending upon the types of products traded by the electronic trading system, customer/trader preferences, bandwidth and data processing limitations, etc. and that all such feeds, now available or later developed, are contemplated herein. MBP/ABV and MBO/PO feeds may refer to categories/variations of market data feeds, distinguished by whether they provide an indication of the current state of a market resulting from a market impacting event (MBP) or an indication of the change in the current state of a market due to a market impacting event (MBO).

Messages, whether MBO or MBP, generated responsive to market impacting events which are caused by a single order, such as a new order, an order cancellation, an order modification, etc., are fairly simple and compact and easily created and transmitted. However, messages, whether MBO or MBP, generated responsive to market impacting events which are caused by more than one order, such as a trade, may require the transmission of a significant amount of data to convey the requisite information to the market participants. For trades involving a large number of orders, e.g., a buy order for a quantity of 5000 which matches 5000 sell orders each for a quantity of 1, a significant amount of information may need to be sent, e.g., data indicative of each of the 5000 trades that have participated in the market impacting event.

In one embodiment, an exchange computing system may generate multiple order book objects, one for each type of view that is published or provided. For example, the system may generate a PO book object and an ABV book object. It should be appreciated that each book object, or view for a product or market, may be derived from the Per Order book object, which includes all the orders for a given financial product or market.

An inbound message may include an order that affects the PO book object, the ABV book object, or both. An outbound message may include data from one or more of the structures within the exchange computing system, e.g., the PO book object queues or the ABV book object queues.

Furthermore, each participating trader needs to receive a notification that their particular order has traded. Continuing with the example, this may require sending 5001 individual trade notification messages, or even 10,000+ messages where each contributing side (buy vs. sell) is separately reported, in addition to the notification sent to all of the market participants.

As detailed in U.S. Patent Publication No. 2015/0161727, the entirety of which is incorporated by reference herein and relied upon, it may be recognized that trade notifications sent to all market participants may include redundant information repeated for each participating trade and a structure of an MBP trade notification message may be provided which results in a more efficient communication of the occurrence of a trade. The message structure may include a header portion which indicates the type of transaction which occurred, i.e., a trade, as well as other general information about the event, an instrument portion which comprises data about each instrument which was traded as part of the transaction, and an order portion which comprises data about each participating order. In one embodiment, the header portion may include a message type, Transaction Time, Match Event Indicator, and Number of Market Data Entries ("No. MD Entries") fields. The instrument portion may include a market data update action indicator ("MD Update Action"), an indication of the Market Data Entry Type ("MD Entry Type"), an identifier of the instrument/ security involved in the transaction ("Security ID"), a report sequence indicator ("Rpt Seq"), the price at which the instrument was traded ("MD Entry PX"), the aggregate quantity traded at the indicated price ("ConsTradeQty"), the number of participating orders ("NumberOfOrders"), and an identifier of the aggressor side ("Aggressor Side") fields. The order portion may further include an identifier of the participating order ("Order ID"), described in more detail below, and the quantity of the order traded ("MD Entry Size") fields. It should be appreciated that the particular fields included in each portion are implementation dependent and that different fields in addition to, or in lieu of, those listed may be included depending upon the implementation. It should be appreciated that the exemplary fields can be compliant with the FIX binary and/or FIX/FAST protocol for the communication of the financial information.

The instrument portion contains a set of fields, e.g., seven fields accounting for 23 bytes, which are repeated for each participating instrument. In complex trades, such as trades involving combination orders or strategies, e.g., spreads, or implied trades, there may be multiple instruments being exchanged among the parties. In one embodiment, the order portion includes only one field, accounting for 4 bytes, for each participating order which indicates the quantity of that order which was traded. As will be discussed below, the order portion may further include an identifier of each order, accounting for an additional 8 bytes, in addition to the quantity thereof traded. As should be appreciated, data which would have been repeated for each participating order, is consolidated or otherwise summarized in the header and instrument portions of the message thereby eliminating redundant information and, overall, significantly reducing the size of the message.

While the disclosed embodiments may be discussed with respect to an MBP market data feed, it should be appreciated that the disclosed embodiments may also be applicable to an MBO market data feed.

Market Segment Gateway

In one embodiment, the disclosed system may include a Market Segment Gateway ("MSG") that is the point of ingress/entry and/or egress/departure for all transactions, i.e., the network traffic/packets containing the data therefore, specific to a single market at which the order of receipt of those transactions may be ascribed. An MSG or Market Segment Gateway may be utilized for the purpose of deterministic operation of the market. The electronic trading system may include multiple markets, and because the electronic trading system includes one MSG for each market/product implemented thereby, the electronic trading system may include multiple MSGs. For more detail on deterministic operation in a trading system, see U.S. Patent Publication No. 2015/0127513 entitled "Transactionally Deterministic High Speed Financial Exchange Having Improved, Efficiency, Communication, Customization, Performance, Access, Trading Opportunities, Credit Controls, And Fault Tolerance" and filed on Nov. 7, 2013 ("the '513 Publication"), the entire disclosure of which is incorporated by reference herein and relied upon.

For example, a participant may send a request for a new transaction, e.g., a request for a new order, to the MSG. The MSG extracts or decodes the request message and determines the characteristics of the request message.

The MSG may include, or otherwise be coupled with, a buffer, cache, memory, database, content addressable memory, data store or other data storage mechanism, or combinations thereof, which stores data indicative of the characteristics of the request message. The request is passed to the transaction processing system, e.g., the match engine.

An MSG or Market Segment Gateway may be utilized for the purpose of deterministic operation of the market. Transactions for a particular market may be ultimately received at the electronic trading system via one or more points of entry, e.g., one or more communications interfaces, at which the disclosed embodiments apply determinism, which as described may be at the point where matching occurs, e.g., at each match engine (where there may be multiple match engines, each for a given product/market, or moved away from the point where matching occurs and closer to the point where the electronic trading system first becomes "aware" of the incoming transaction, such as the point where transaction messages, e.g., orders, ingress the electronic trading system. Generally, the terms "determinism" or "transactional determinism" may refer to the processing, or the appearance thereof, of orders in accordance with defined business rules. Accordingly, as used herein, the point of determinism may be the point at which the electronic trading system ascribes an ordering to incoming transactions/orders relative to other incoming transactions/orders such that the ordering may be factored into the subsequent processing, e.g., matching, of those transactions/orders as will be described. For more detail on deterministic operation in a trading system, see the '513 Publication.

Electronic Trading

Electronic trading of financial instruments, such as futures contracts, is conducted by market participants sending orders, such as to buy or sell one or more futures contracts, in electronic form to the exchange. These electronically submitted orders to buy and sell are then matched, if possible, by the exchange, i.e., by the exchange's matching engine, to execute a trade. Outstanding (unmatched, wholly unsatisfied/unfilled or partially satisfied/filled) orders are maintained in one or more data structures or databases referred to as "order books," such orders being referred to as "resting," and made visible, i.e., their availability for trading is advertised, to the market participants through electronic notifications/broadcasts, referred to as market data feeds. An order book is typically maintained for each product, e.g., instrument, traded on the electronic trading system and generally defines or otherwise represents the state of the market for that product, i.e., the current prices at which the market participants are willing buy or sell that product. As such, as used herein, an order book for a product may also be referred to as a market for that product.

Upon receipt of an incoming order to trade in a particular financial instrument, whether for a single-component financial instrument, e.g., a single futures contract, or for a multiple-component financial instrument, e.g., a combination contract such as a spread contract, a match engine, as described herein, will attempt to identify a previously received but unsatisfied order counter thereto, i.e., for the opposite transaction (buy or sell) in the same financial instrument at the same or better price (but not necessarily for the same quantity unless, for example, either order specifies a condition that it must be entirely filled or not at all).

Previously received but unsatisfied orders, i.e., orders which either did not match with a counter order when they were received or their quantity was only partially satisfied, referred to as a partial fill, are maintained by the electronic trading system in an order book database/data structure to await the subsequent arrival of matching orders or the occurrence of other conditions which may cause the order to be modified or otherwise removed from the order book.

If the match engine identifies one or more suitable previously received but unsatisfied counter orders, they, and the incoming order, are matched to execute a trade there between to at least partially satisfy the quantities of one or both the incoming order or the identified orders. If there remains any residual unsatisfied quantity of the identified one or more orders, those orders are left on the order book with their remaining quantity to await a subsequent suitable counter order, i.e., to rest. If the match engine does not identify a suitable previously received but unsatisfied counter order, or the one or more identified suitable previously received but unsatisfied counter orders are for a lesser quantity than the incoming order, the incoming order is placed on the order book, referred to as "resting", with original or remaining unsatisfied quantity, to await a subsequently received suitable order counter thereto. The match engine then generates match event data reflecting the result of this matching process. Other components of the electronic trading system, as will be described, then generate the respective order acknowledgment and market data messages and transmit those messages to the market participants.

Matching, which is a function typically performed by the exchange, is a process, for a given order which specifies a desire to buy or sell a quantity of a particular instrument at a particular price, of seeking/identifying one or more wholly or partially, with respect to quantity, satisfying counter orders thereto, e.g., a sell counter to an order to buy, or vice versa, for the same instrument at the same, or sometimes better, price (but not necessarily the same quantity), which are then paired for execution to complete a trade between the respective market participants (via the exchange) and at least partially satisfy the desired quantity of one or both of the order and/or the counter order, with any residual unsatisfied quantity left to await another suitable counter order, referred to as "resting." A match event may occur, for example, when an aggressing order matches with a resting order. In one embodiment, two orders match because one order includes instructions for or specifies buying a quantity of a particular instrument at a particular price, and the other order includes instructions for or specifies selling a (different or same) quantity of the instrument at a same or better price. It should be appreciated that performing an instruction associated with a message may include attempting to perform the instruction. Whether or not an exchange computing system is able to successfully perform an instruction may depend on the state of the electronic marketplace.

While the disclosed embodiments will be described with respect to a product by product or market by market implementation, e.g. implemented for each market/order book, it will be appreciated that the disclosed embodiments may be implemented so as to apply across markets for multiple products traded on one or more electronic trading systems, such as by monitoring an aggregate, correlated or other derivation of the relevant indicative parameters as described herein.

While the disclosed embodiments may be discussed in relation to futures and/or options on futures trading, it should be appreciated that the disclosed embodiments may be applicable to any equity, fixed income security, currency, commodity, options or futures trading system or market now available or later developed. It may be appreciated that a trading environment, such as a futures exchange as described herein, implements one or more economic markets where rights and obligations may be traded. As such, a trading environment may be characterized by a need to maintain market integrity, transparency, predictability, fair/equitable access and participant expectations with respect thereto. In addition, it may be appreciated that electronic trading systems further impose additional expectations and demands by market participants as to transaction processing speed, latency, capacity and response time, while creating additional complexities relating thereto. Accordingly, as will be described, the disclosed embodiments may further include functionality to ensure that the expectations of market participants are met, e.g., that transactional integrity and predictable system responses are maintained.

Financial instrument trading systems allow traders to submit orders and receive confirmations, market data, and other information electronically via electronic messages exchanged using a network. Electronic trading systems ideally attempt to offer a more efficient, fair and balanced market where market prices reflect a true consensus of the value of traded products among the market participants, where the intentional or unintentional influence of any one market participant is minimized if not eliminated, and where unfair or inequitable advantages with respect to information access are minimized if not eliminated.

Electronic marketplaces attempt to achieve these goals by using electronic messages to communicate actions and related data of the electronic marketplace between market participants, clearing firms, clearing houses, and other parties. The messages can be received using an electronic trading system, wherein an action or transaction associated with the messages may be executed. For example, the message may contain information relating to an order to buy or sell a product in a particular electronic marketplace, and the action associated with the message may indicate that the order is to be placed in the electronic marketplace such that other orders which were previously placed may potentially be matched to the order of the received message. Thus the electronic marketplace may conduct market activities through electronic systems.

Clearing House

The clearing house of an exchange clears, settles and guarantees matched transactions in contracts occurring through the facilities of the exchange. In addition, the clearing house establishes and monitors financial requirements for clearing members and conveys certain clearing privileges in conjunction with the relevant exchange markets.

The clearing house establishes clearing level performance bonds (margins) for all products of the exchange and establishes minimum performance bond requirements for customers of such products. A performance bond, also referred to as a margin requirement, corresponds with the funds that must be deposited by a customer with his or her broker, by a broker with a clearing member or by a clearing member with the clearing house, for the purpose of insuring the broker or clearing house against loss on open futures or options contracts. This is not a part payment on a purchase. The performance bond helps to ensure the financial integrity of brokers, clearing members and the exchange as a whole. The performance bond refers to the minimum dollar deposit required by the clearing house from clearing members in accordance with their positions. Maintenance, or maintenance margin, refers to a sum, usually smaller than the initial performance bond, which must remain on deposit in the customer's account for any position at all times. The initial margin is the total amount of margin per contract required by the broker when a futures position is opened. A drop in funds below this level requires a deposit back to the initial margin levels, i.e., a performance bond call. If a customer's equity in any futures position drops to or under the maintenance level because of adverse price action, the broker must issue a performance bond/margin call to restore the customer's equity. A performance bond call, also referred to as a margin call, is a demand for additional funds to bring the customer's account back up to the initial performance bond level whenever adverse price movements cause the account to go below the maintenance.

The exchange derives its financial stability in large part by removing debt obligations among market participants as they occur. This is accomplished by determining a settlement price at the close of the market each day for each contract and marking all open positions to that price, referred to as "mark to market." Every contract is debited or credited based on that trading session's gains or losses. As prices move for or against a position, funds flow into and out of the trading account. In the case of the CME, each business day by 6:40 a.m. Chicago time, based on the mark-to-the-market of all open positions to the previous trading day's settlement price, the clearing house pays to or collects cash from each clearing member. This cash flow, known as settlement variation, is performed by CME's settlement banks based on instructions issued by the clearing house. All payments to and collections from clearing members are made in "same-day" funds. In addition to the 6:40 a.m. settlement, a daily intra-day mark-to-the market of all open positions, including trades executed during the overnight GLOBEX®, the CME's electronic trading systems, trading session and the current day's trades matched before 11:15 a.m., is performed using current prices. The resulting cash payments are made intra-day for same day value. In times of extreme price volatility, the clearing house has the authority to perform additional intra-day mark-to-the-market calculations on open positions and to call for immediate payment of settlement variation. CME's mark-to-the-market settlement system differs from the settlement systems implemented by many other financial markets, including the interbank, Treasury securities, over-the-counter foreign exchange and debt, options, and equities markets, where participants regularly assume credit exposure to each other. In those markets, the failure of one participant can have a ripple effect on the solvency of the other participants. Conversely, CME's mark-to-the-market system does not allow losses to accumulate over time or allow a market participant the opportunity to defer losses associated with market positions.

While the disclosed embodiments may be described in reference to the CME, it should be appreciated that these embodiments are applicable to any exchange. Such other exchanges may include a clearing house that, like the CME clearing house, clears, settles and guarantees all matched transactions in contracts of the exchange occurring through its facilities. In addition, such clearing houses establish and monitor financial requirements for clearing members and convey certain clearing privileges in conjunction with the relevant exchange markets.

The disclosed embodiments are also not limited to uses by a clearing house or exchange for purposes of enforcing a performance bond or margin requirement. For example, a market participant may use the disclosed embodiments in a simulation or other analysis of a portfolio. In such cases, the settlement price may be useful as an indication of a value at risk and/or cash flow obligation rather than a performance bond. The disclosed embodiments may also be used by market participants or other entities to forecast or predict the effects of a prospective position on the margin requirement of the market participant.

Trading Environment

The embodiments may be described in terms of a distributed computing system. The particular examples identify a specific set of components useful in a futures and options exchange. However, many of the components and inventive features are readily adapted to other electronic trading environments. The specific examples described herein may teach specific protocols and/or interfaces, although it should be understood that the principals involved may be extended to, or applied in, other protocols and interfaces.

It should be appreciated that the plurality of entities utilizing or involved with the disclosed embodiments, e.g., the market participants, may be referred to by other nomenclature reflecting the role that the particular entity is performing with respect to the disclosed embodiments and that a given entity may perform more than one role depending upon the implementation and the nature of the particular transaction being undertaken, as well as the entity's contractual and/or legal relationship with another market participant and/or the exchange.

An exemplary trading network environment for implementing trading systems and methods is shown in FIG. 1. An exchange computer system 100 receives messages that include orders and transmits market data related to orders and trades to users, such as via wide area network 162 and/or local area network 160 and computer devices 150, 152, 154, 156 and 158, as described herein, coupled with the exchange computer system 100.

Herein, the phrase "coupled with" is defined to mean directly connected to or indirectly connected through one or more intermediate components. Such intermediate components may include both hardware and software based components. Further, to clarify the use in the pending claims and to hereby provide notice to the public, the phrases "at least one of <A>, <B>, . . . and <N>" or "at least one of <A>, <B>, . . . <N>, or combinations thereof" are defined by the Applicant in the broadest sense, superseding any other implied definitions herebefore or hereinafter unless expressly asserted by the Applicant to the contrary, to mean one or more elements selected from the group comprising A, B, . . . and N, that is to say, any combination of one or more of the elements A, B, . . . or N including any one element alone or in combination with one or more of the other elements which may also include, in combination, additional elements not listed.

Figure 2:
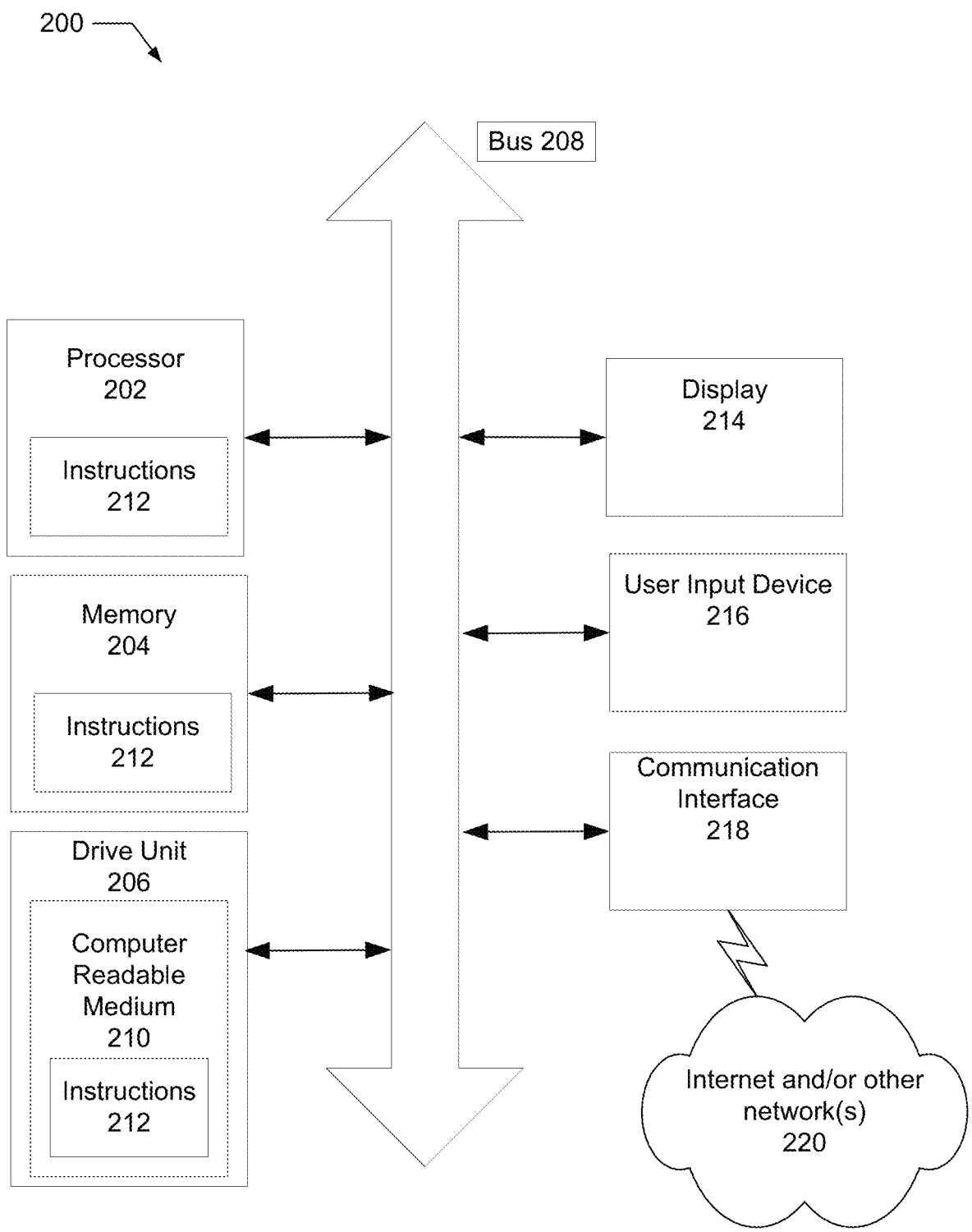
FIG. 2 depicts a general computer system, according to some embodiments.

The exchange computer system 100 may be implemented with one or more mainframe, desktop or other computers, such as the example computer 200 described herein with respect to FIG. 2. A user database 102 may be provided which includes information identifying traders and other users of exchange computer system 100, such as account numbers or identifiers, user names and passwords. An account data module 104 may be provided which may process account information that may be used during trades.

A match engine module 106 may be included to match bid and offer prices and may be implemented with software that executes one or more algorithms for matching bids and offers. A trade database 108 may be included to store information identifying trades and descriptions of trades. In particular, a trade database may store information identifying the time that a trade took place and the contract price. An order book module 110 may be included to compute or otherwise determine current bid and offer prices, e.g., in a continuous auction market, or also operate as an order accumulation buffer for a batch auction market.

A market data module 112 may be included to collect market data and prepare the data for transmission to users.

A risk management module 114 may be included to compute and determine a user's risk utilization in relation to the user's defined risk thresholds. The risk management module 114 may also be configured to determine risk assessments or exposure levels in connection with positions held by a market participant. The risk management module 114 may be configured to administer, manage or maintain one or more margining mechanisms implemented by the exchange computer system 100. Such administration, management or maintenance may include managing a number of database records reflective of margin accounts of the market participants. In some embodiments, the risk management module 114 implements one or more aspects of the disclosed embodiments, including, for instance, principal component analysis (PCA) based margining, in connection with interest rate swap (IRS) portfolios, as described herein.

A message management module 116 may be included to, among other things, receive, and extract orders from, electronic data transaction request messages. The message management module 116 may define a point of ingress into the exchange computer system 100 where messages are ordered and considered to be received by the system. This may be considered a point of determinism in the exchange computer system 100 that defines the earliest point where the system can ascribe an order of receipt to arriving messages. The point of determinism may or may not be at or near the demarcation point between the exchange computer system 100 and a public/internet network infrastructure. The message management module 116 processes messages by interpreting the contents of a message based on the message transmit protocol, such as the transmission control protocol ("TCP"), to provide the content of the message for further processing by the exchange computer system.

The message management module 116 may also be configured to detect characteristics of an order for a transaction to be undertaken in an electronic marketplace. For example, the message management module 116 may identify and extract order content such as a price, product, volume, and associated market participant for an order. The message management module 116 may also identify and extract data indicating an action to be executed by the exchange computer system 100 with respect to the extracted order. For example, the message management module 116 may determine the transaction type of the transaction requested in a given message. A message may include an instruction to perform a type of transaction. The transaction type may be, in one embodiment, a request/offer/order to either buy or sell a specified quantity or units of a financial instrument at a specified price or value. The message management module 116 may also identify and extract other order information and other actions associated with the extracted order. All extracted order characteristics, other information, and associated actions extracted from a message for an order may be collectively considered an order as described and referenced herein.

Order or message characteristics may include, for example, the state of the system after a message is received, arrival time (e.g., the time a message arrives at the MSG or Market Segment Gateway), message type (e.g., new, modify, cancel), and the number of matches generated by a message. Order or message characteristics may also include market participant side (e.g., buyer or seller) or time in force (e.g., a good until end of day order that is good for the full trading day, a good until canceled ordered that rests on the order book until matched, or a fill or kill order that is canceled if not filled immediately, or a fill and kill order (FOK) that is filled to the maximum amount possible, and any remaining or unfilled/unsatisfied quantity is not stored on the books or allowed to rest).

An order processing module 118 may be included to decompose delta-based, spread instrument, bulk and other types of composite orders for processing by the order book module 110 and/or the match engine module 106. The order processing module 118 may also be used to implement one or more procedures related to clearing an order. The order may be communicated from the message management module 118 to the order processing module 118. The order processing module 118 may be configured to interpret the communicated order, and manage the order characteristics, other information, and associated actions as they are processed through an order book module 110 and eventually transacted on an electronic market. For example, the order processing module 118 may store the order characteristics and other content and execute the associated actions. In an embodiment, the order processing module may execute an associated action of placing the order into an order book for an electronic trading system managed by the order book module 110. In an embodiment, placing an order into an order book and/or into an electronic trading system may be considered a primary action for an order. The order processing module 118 may be configured in various arrangements, and may be configured as part of the order book module 110, part of the message management module 118, or as an independent functioning module.

As an intermediary to electronic trading transactions, the exchange bears a certain amount of risk in each transaction that takes place. To that end, the clearing house implements risk management mechanisms to protect the exchange. One or more of the modules of the exchange computer system 100 may be configured to determine settlement prices for constituent contracts, such as deferred month contracts, of spread instruments, such as for example, settlement module 120. A settlement module 120 (or settlement processor or other payment processor) may be included to provide one or more functions related to settling or otherwise administering transactions cleared by the exchange. Settlement module 120 of the exchange computer system 100 may implement one or more settlement price determination techniques. Settlement-related functions need not be limited to actions or events occurring at the end of a contract term. For instance, in some embodiments, settlement-related functions may include or involve daily or other mark to market settlements for margining purposes. In some cases, the settlement module 120 may be configured to communicate with the trade database 108 (or the memory(ies) on which the trade database 108 is stored) and/or to determine a payment amount based on a spot price, the price of the futures contract or other financial instrument, or other price data, at various times. The determination may be made at one or more points in time during the term of the financial instrument in connection with a margining mechanism. For example, the settlement module 120 may be used to determine a mark to market amount on a daily basis during the term of the financial instrument. Such determinations may also be made on a settlement date for the financial instrument for the purposes of final settlement.

In some embodiments, the settlement module 120 may be integrated to any desired extent with one or more of the other modules or processors of the exchange computer system 100. For example, the settlement module 120 and the risk management module 114 may be integrated to any desired extent. In some cases, one or more margining procedures or other aspects of the margining mechanism(s) may be implemented by the settlement module 120.

One or more of the above-described modules of the exchange computer system 100 may be used to gather or obtain data to support the settlement price determination, as well as a subsequent margin requirement determination. For example, the order book module 110 and/or the market data module 112 may be used to receive, access, or otherwise obtain market data, such as bid-offer values of orders currently on the order books. The trade database 108 may be used to receive, access, or otherwise obtain trade data indicative of the prices and volumes of trades that were recently executed in a number of markets. In some cases, transaction data (and/or bid/ask data) may be gathered or obtained from open outcry pits and/or other sources and incorporated into the trade and market data from the electronic trading system(s).

It should be appreciated that concurrent processing limits may be defined by or imposed separately or in combination on one or more of the trading system components, including the user database 102, the account data module 104, the match engine module 106, the trade database 108, the order book module 110, the market data module 112, the risk management module 114, the message management module 116, the order processing module 118, the settlement module 120, or other component of the exchange computer system 100.

The disclosed mechanisms may be implemented at any logical and/or physical point(s), or combinations thereof, at which the relevant information/data (e.g., message traffic and responses thereto) may be monitored or flows or is otherwise accessible or measurable, including one or more gateway devices, modems, the computers or terminals of one or more market participants, e.g., client computers, etc.

One skilled in the art will appreciate that one or more modules described herein may be implemented using, among other things, a tangible computer-readable medium comprising computer-executable instructions (e.g., executable software code). Alternatively, modules may be implemented as software code, firmware code, specifically configured hardware or processors, and/or a combination of the aforementioned. For example, the modules may be embodied as part of an exchange 100 for financial instruments. It should be appreciated the disclosed embodiments may be implemented as a different or separate module of the exchange computer system 100, or a separate computer system coupled with the exchange computer system 100 so as to have access to margin account record, pricing, and/or other data. As described herein, the disclosed embodiments may be implemented as a centrally accessible system or as a distributed system, e.g., where some of the disclosed functions are performed by the computer systems of the market participants.

The trading network environment shown in FIG. 1 includes exemplary computer devices 150, 152, 154, 156 and 158 which depict different exemplary methods or media by which a computer device may be coupled with the exchange computer system 100 or by which a user may communicate, e.g., send and receive, trade or other information therewith. It should be appreciated that the types of computer devices deployed by traders and the methods and media by which they communicate with the exchange computer system 100 is implementation dependent and may vary and that not all of the depicted computer devices and/or means/media of communication may be used and that other computer devices and/or means/media of communications, now available or later developed may be used. Each computer device, which may comprise a computer 200 described in more detail with respect to FIG. 2, may include a central processor, specifically configured or otherwise, that controls the overall operation of the computer and a system bus that connects the central processor to one or more conventional components, such as a network card or modem. Each computer device may also include a variety of interface units and drives for reading and writing data or files and communicating with other computer devices and with the exchange computer system 100. Depending on the type of computer device, a user can interact with the computer with a keyboard, pointing device, microphone, pen device or other input device now available or later developed.

An exemplary computer device 150 is shown directly connected to exchange computer system 100, such as via a Ti line, a common local area network (LAN) or other wired and/or wireless medium for connecting computer devices, such as the network 220 shown in FIG. 2 and described with respect thereto. The exemplary computer device 150 is further shown connected to a radio 168. The user of radio 168, which may include a cellular telephone, smart phone, or other wireless proprietary and/or non-proprietary device, may be a trader or exchange employee. The radio user may transmit orders or other information to the exemplary computer device 150 or a user thereof. The user of the exemplary computer device 150, or the exemplary computer device 150 alone and/or autonomously, may then transmit the trade or other information to the exchange computer system 100.

Exemplary computer devices 152 and 154 are coupled with a local area network ("LAN") 160 which may be configured in one or more of the well-known LAN topologies, e.g., star, daisy chain, etc., and may use a variety of different protocols, such as Ethernet, TCP/IP, etc. The exemplary computer devices 152 and 154 may communicate with each other and with other computer and other devices which are coupled with the LAN 160. Computer and other devices may be coupled with the LAN 160 via twisted pair wires, coaxial cable, fiber optics or other wired or wireless media. As shown in FIG. 1, an exemplary wireless personal digital assistant device ("PDA") 158, such as a mobile telephone, tablet based compute device, or other wireless device, may communicate with the LAN 160 and/or the Internet 162 via radio waves, such as via WiFi, Bluetooth and/or a cellular telephone based data communications protocol. PDA 158 may also communicate with exchange computer system 100 via a conventional wireless hub 164.

FIG. 1 also shows the LAN 160 coupled with a wide area network ("WAN") 162 which may be comprised of one or more public or private wired or wireless networks. In one embodiment, the WAN 162 includes the Internet 162. The LAN 160 may include a router to connect LAN 160 to the Internet 162. Exemplary computer device 156 is shown coupled directly to the Internet 162, such as via a modem, DSL line, satellite dish or any other device for connecting a computer device to the Internet 162 via a service provider therefore as is known. LAN 160 and/or WAN 162 may be the same as the network 220 shown in FIG. 2 and described with respect thereto.

Users of the exchange computer system 100 may include one or more market makers 166 which may maintain a market by providing constant bid and offer prices for a derivative or security to the exchange computer system 100, such as via one of the exemplary computer devices depicted. The exchange computer system 100 may also exchange information with other match or trade engines, such as trade engine 170. One skilled in the art will appreciate that numerous additional computers and systems may be coupled to exchange computer system 100. Such computers and systems may include clearing, regulatory and fee systems.

The operations of computer devices and systems shown in FIG. 1 may be controlled by computer-executable instructions stored on a non-transitory computer-readable medium. For example, the exemplary computer device 152 may store computer-executable instructions for receiving order information from a user, transmitting that order information to exchange computer system 100 in electronic messages, extracting the order information from the electronic messages, executing actions relating to the messages, and/or calculating values from characteristics of the extracted order to facilitate matching orders and executing trades. In another example, the exemplary computer device 154 may include computer-executable instructions for receiving market data from exchange computer system 100 and displaying that information to a user.

Numerous additional servers, computers, handheld devices, personal digital assistants, telephones and other devices may also be connected to exchange computer system 100. Moreover, one skilled in the art will appreciate that the topology shown in FIG. 1 is merely an example and that the components shown in FIG. 1 may include other components not shown and be connected by numerous alternative topologies.

Referring now to FIG. 2, an illustrative embodiment of a general computer system 200 is shown. The computer system 200 can include a set of instructions that can be executed to cause the computer system 200 to perform any one or more of the methods or computer based functions disclosed herein. The computer system 200 may operate as a standalone device or may be connected, e.g., using a network, to other computer systems or peripheral devices. Any of the components discussed herein, such as processor 202, may be a computer system 200 or a component in the computer system 200. The computer system 200 may be specifically configured to implement a match engine, margin processing, payment or clearing function on behalf of an exchange, such as the Chicago Mercantile Exchange, of which the disclosed embodiments are a component thereof.

In a networked deployment, the computer system 200 may operate in the capacity of a server or as a client user computer in a client-server user network environment, or as a peer computer system in a peer-to-peer (or distributed) network environment. The computer system 200 can also be implemented as or incorporated into various devices, such as a personal computer (PC), a tablet PC, a set-top box (STB), a personal digital assistant (PDA), a mobile device, a palmtop computer, a laptop computer, a desktop computer, a communications device, a wireless telephone, a land-line telephone, a control system, a camera, a scanner, a facsimile machine, a printer, a pager, a personal trusted device, a web appliance, a network router, switch or bridge, or any other machine capable of executing a set of instructions (sequential or otherwise) that specify actions to be taken by that machine. In a particular embodiment, the computer system 200 can be implemented using electronic devices that provide voice, video or data communication. Further, while a single computer system 200 is illustrated, the term "system" shall also be taken to include any collection of systems or sub-systems that individually or jointly execute a set, or multiple sets, of instructions to perform one or more computer functions.

As illustrated in FIG. 2, the computer system 200 may include a processor 202, e.g., a central processing unit (CPU), a graphics processing unit (GPU), or both. The processor 202 may be a component in a variety of systems. For example, the processor 202 may be part of a standard personal computer or a workstation. The processor 202 may be one or more general processors, digital signal processors, specifically configured processors, application specific integrated circuits, field programmable gate arrays, servers, networks, digital circuits, analog circuits, combinations thereof, or other now known or later developed devices for analyzing and processing data. The processor 202 may implement a software program, such as code generated manually (i.e., programmed).

The computer system 200 may include a memory 204 that can communicate via a bus 208. The memory 204 may be a main memory, a static memory, or a dynamic memory. The memory 204 may include, but is not limited to, computer readable storage media such as various types of volatile and non-volatile storage media, including but not limited to random access memory, read-only memory, programmable read-only memory, electrically programmable read-only memory, electrically erasable read-only memory, flash memory, magnetic tape or disk, optical media and the like. In one embodiment, the memory 204 includes a cache or random access memory for the processor 202. In alternative embodiments, the memory 204 is separate from the processor 202, such as a cache memory of a processor, the system memory, or other memory. The memory 204 may be an external storage device or database for storing data. Examples include a hard drive, compact disc ("CD"), digital video disc ("DVD"), memory card, memory stick, floppy disc, universal serial bus ("USB") memory device, or any other device operative to store data. The memory 204 is operable to store instructions executable by the processor 202. The functions, acts or tasks illustrated in the figures or described herein may be performed by the programmed processor 202 executing the instructions 212 stored in the memory 204. The functions, acts or tasks are independent of the particular type of instructions set, storage media, processor or processing strategy and may be performed by software, hardware, integrated circuits, firm-ware, microcode and the like, operating alone or in combination. Likewise, processing strategies may include multiprocessing, multitasking, parallel processing and the like.

As shown, the computer system 200 may further include a display unit 214, such as a liquid crystal display (LCD), an organic light emitting diode (OLED), a flat panel display, a solid state display, a cathode ray tube (CRT), a projector, a printer or other now known or later developed display device for outputting determined information. The display 214 may act as an interface for the user to see the functioning of the processor 202, or specifically as an interface with the software stored in the memory 204 or in the drive unit 206.

Additionally, the computer system 200 may include an input device 216 configured to allow a user to interact with any of the components of system 200. The input device 216 may be a number pad, a keyboard, or a cursor control device, such as a mouse, or a joystick, touch screen display, remote control or any other device operative to interact with the system 200.

In a particular embodiment, as depicted in FIG. 2, the computer system 200 may also include a disk or optical drive unit 206. The disk drive unit 206 may include a computer-readable medium 210 in which one or more sets of instructions 212, e.g., software, can be embedded. Further, the instructions 212 may embody one or more of the methods or logic as described herein. In a particular embodiment, the instructions 212 may reside completely, or at least partially, within the memory 204 and/or within the processor 202 during execution by the computer system 200. The memory 204 and the processor 202 also may include computer-readable media as discussed herein.

The present disclosure contemplates a computer-readable medium that includes instructions 212 or receives and executes instructions 212 responsive to a propagated signal, so that a device connected to a network 220 can communicate voice, video, audio, images or any other data over the network 220. Further, the instructions 212 may be transmitted or received over the network 220 via a communication interface 218. The communication interface 218 may be a part of the processor 202 or may be a separate component. The communication interface 218 may be created in software or may be a physical connection in hardware. The communication interface 218 is configured to connect with a network 220, external media, the display 214, or any other components in system 200, or combinations thereof. The connection with the network 220 may be a physical connection, such as a wired Ethernet connection or may be established wirelessly. Likewise, the additional connections with other components of the system 200 may be physical connections or may be established wirelessly.

The network 220 may include wired networks, wireless networks, or combinations thereof. The wireless network may be a cellular telephone network, an 802.11, 802.16, 802.20, or WiMax network. Further, the network 220 may be a public network, such as the Internet, a private network, such as an intranet, or combinations thereof, and may utilize a variety of networking protocols now available or later developed including, but not limited to, TCP/IP based networking protocols.

Embodiments of the subject matter and the functional operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer program products, i.e., one or more modules of computer program instructions encoded on a computer readable medium for execution by, or to control the operation of, data processing apparatus. While the computer-readable medium is shown to be a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding or carrying a set of instructions for execution by a processor or that cause a computer system to perform any one or more of the methods or operations disclosed herein. The computer readable medium can be a machine-readable storage device, a machine-readable storage substrate, a memory device, or a combination of one or more of them. The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them.

In a particular non-limiting, exemplary embodiment, the computer-readable medium can include a solid-state memory such as a memory card or other package that houses one or more non-volatile read-only memories. Further, the computer-readable medium can be a random access memory or other volatile re-writable memory. Additionally, the computer-readable medium can include a magneto-optical or optical medium, such as a disk or tapes or other storage device to capture carrier wave signals such as a signal communicated over a transmission medium. A digital file attachment to an e-mail or other self-contained information archive or set of archives may be considered a distribution medium that is a tangible storage medium. Accordingly, the disclosure is considered to include any one or more of a computer-readable medium or a distribution medium and other equivalents and successor media, in which data or instructions may be stored.

In an alternative embodiment, dedicated or otherwise specifically configured hardware implementations, such as application specific integrated circuits, programmable logic arrays and other hardware devices, can be constructed to implement one or more of the methods described herein. Applications that may include the apparatus and systems of various embodiments can broadly include a variety of electronic and computer systems. One or more embodiments described herein may implement functions using two or more specific interconnected hardware modules or devices with related control and data signals that can be communicated between and through the modules, or as portions of an application-specific integrated circuit. Accordingly, the present system encompasses software, firmware, and hardware implementations.

In accordance with various embodiments of the present disclosure, the methods described herein may be implemented by software programs executable by a computer system. Further, in an exemplary, non-limited embodiment, implementations can include distributed processing, component/object distributed processing, and parallel processing. Alternatively, virtual computer system processing can be constructed to implement one or more of the methods or functionality as described herein.

Although the present specification describes components and functions that may be implemented in particular embodiments with reference to particular standards and protocols, the invention is not limited to such standards and protocols. For example, standards for Internet and other packet switched network transmission (e.g., TCP/IP, UDP/IP, HTML, HTTP, HTTPS) represent examples of the state of the art. Such standards are periodically superseded by faster or more efficient equivalents having essentially the same functions. Accordingly, replacement standards and protocols having the same or similar functions as those disclosed herein are considered equivalents thereof.

A computer program (also known as a program, software, software application, script, or code) can be written in any form of programming language, including compiled or interpreted languages, and it can be deployed in any form, including as a standalone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and anyone or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio player, a Global Positioning System (GPS) receiver, to name just a few. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

As used herein, the terms "microprocessor" or "general-purpose processor" ("GPP") may refer to a hardware device that fetches instructions and data from a memory or storage device and executes those instructions (for example, an Intel Xeon processor or an AMD Opteron processor) to then, for example, process the data in accordance therewith. The term "reconfigurable logic" may refer to any logic technology whose form and function can be significantly altered (i.e., reconfigured) in the field post-manufacture as opposed to a microprocessor, whose function can change post-manufacture, e.g. via computer executable software code, but whose form, e.g. the arrangement/layout and interconnection of logical structures, is fixed at manufacture. The term "software" may refer to data processing functionality that is deployed on a GPP. The term "firmware" may refer to data processing functionality that is deployed on reconfigurable logic. One example of a reconfigurable logic is a field programmable gate array ("FPGA") which is a reconfigurable integrated circuit. An FPGA may contain programmable logic components called "logic blocks", and a hierarchy of reconfigurable interconnects that allow the blocks to be "wired together", somewhat like many (changeable) logic gates that can be inter-wired in (many) different configurations. Logic blocks may be configured to perform complex combinatorial functions, or merely simple logic gates like AND, OR, NOT and XOR. An FPGA may further include memory elements, which may be simple flip-flops or more complete blocks of memory.

To provide for interaction with a user, embodiments of the subject matter described in this specification can be implemented on a device having a display, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well. Feedback provided to the user can be any form of sensory feedback, e.g., visual feedback, auditory feedback, or tactile feedback. Input from the user can be received in any form, including acoustic, speech, or tactile input.

Embodiments of the subject matter described in this specification can be implemented in a computing system that includes a back end component, e.g., a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

It should be appreciated that the disclosed embodiments may be applicable to other types of messages depending upon the implementation. Further, the messages may comprise one or more data packets, datagrams or other collection of data formatted, arranged configured and/or packaged in a particular one or more protocols, e.g., the FIX protocol, TCP/IP, Ethernet, etc., suitable for transmission via a network 214 as was described, such as the message format and/or protocols described in U.S. Pat. No. 7,831,491 and U.S. Patent Publication No. 2005/0096999 A1, both of which are incorporated by reference herein in their entireties and relied upon. Further, the disclosed message management system may be implemented using an open message standard implementation, such as FIX, FIX Binary, FIX/FAST, or by an exchange-provided API.

The embodiments described herein utilize trade related electronic messages such as mass quote messages, individual order messages, modification messages, cancellation messages, etc., so as to enact trading activity in an electronic market. The trading entity and/or market participant may have one or multiple trading terminals associated with the session. Furthermore, the financial instruments may be financial derivative products. Derivative products may include futures contracts, options on futures contracts, futures contracts that are functions of or related to other futures contracts, swaps, swaptions, or other financial instruments that have their price related to or derived from an underlying product, security, commodity, equity, index, or interest rate product. In one embodiment, the orders are for options contracts that belong to a common option class. Orders may also be for baskets, quadrants, other combinations of financial instruments, etc. The option contracts may have a plurality of strike prices and/or comprise put and call contracts. A mass quote message may be received at an exchange. As used herein, an exchange computing system 100 includes a place or system that receives and/or executes orders.

In an embodiment, a plurality of electronic messages is received from the network. The plurality of electronic messages may be received at a network interface for the electronic trading system. The plurality of electronic messages may be sent from market participants. The plurality of messages may include order characteristics and be associated with actions to be executed with respect to an order that may be extracted from the order characteristics. The action may involve any action as associated with transacting the order in an electronic trading system. The actions may involve placing the orders within a particular market and/or order book of a market in the electronic trading system.

In an embodiment, an incoming transaction may be received. The incoming transaction may be from, and therefore associated with, a market participant of an electronic market managed by an electronic trading system. The transaction may involve an order as extracted from a received message, and may have an associated action. The actions may involve placing an order to buy or sell a financial product in the electronic market, or modifying or deleting such an order. In an embodiment, the financial product may be based on an associated financial instrument which the electronic market is established to trade.

In an embodiment, the action associated with the transaction is determined. For example, it may be determined whether the incoming transaction comprises an order to buy or sell a quantity of the associated financial instrument or an order to modify or cancel an existing order in the electronic market. Orders to buy or sell and orders to modify or cancel may be acted upon differently by the electronic market. For example, data indicative of different characteristics of the types of orders may be stored.

In an embodiment, data relating to the received transaction is stored. The data may be stored in any device, or using any technique, operable to store and provide recovery of data. For example, a memory 204 or computer readable medium 210, may be used to store data, as is described with respect to FIG. 2 in further detail herein. Data may be stored relating received transactions for a period of time, indefinitely, or for a rolling most recent time period such that the stored data is indicative of the market participant's recent activity in the electronic market.

If and/or when a transaction is determined to be an order to modify or cancel a previously placed, or existing, order, data indicative of these actions may be stored. For example, data indicative of a running count of a number or frequency of the receipt of modify or cancel orders from the market participant may be stored. A number may be a total number of modify or cancel orders received from the market participant, or a number of modify or cancel orders received from the market participant over a specified time. A frequency may be a time based frequency, as in a number of cancel or modify orders per unit of time, or a number of cancel or modify orders received from the market participant as a percentage of total transactions received from the participant, which may or may not be limited by a specified length of time.

If and/or when a transaction is determined to be an order to buy or sell a financial product, or financial instrument, other indicative data may be stored. For example, data indicative of quantity and associated price of the order to buy or sell may be stored.

Data indicative of attempts to match incoming orders may also be stored. The data may be stored in any device, or using any technique, operable to store and provide recovery of data. For example, a memory 204 or computer readable medium 210, may be used to store data, as is described with respect to FIG. 2. The acts of the process as described herein may also be repeated. As such, data for multiple received transactions for multiple market participants may be stored and used as describe herein.

The order processing module 118 may also store data indicative of characteristics of the extracted orders. For example, the order processing module may store data indicative of orders having an associated modify or cancel action, such as by recording a count of the number of such orders associated with particular market participants. The order processing module may also store data indicative of quantities and associated prices of orders to buy or sell a product placed in the market order book 110, as associated with particular market participants.

Also, the order processing module 118 may be configured to calculate and associate with particular orders a value indicative of an associated market participant's market activity quality, which is a value indicative of whether the market participant's market activity increases or tends to increase liquidity of a market. This value may be determined based on the price of the particular order, previously stored quantities of orders from the associated market participant, the previously stored data indicative of previously received orders to modify or cancel as associated with the market participant, and previously stored data indicative of a result of the attempt to match previously received orders stored in association with the market participant. The order processing module 118 may determine or otherwise calculate scores indicative of the quality value based on these stored extracted order characteristics, such as an MQI as described herein.

Further, electronic trading systems may perform actions on orders placed from received messages based on various characteristics of the messages and/or market participants associated with the messages. These actions may include matching the orders either during a continuous auction process, or at the conclusion of a collection period during a batch auction process. The matching of orders may be by any technique.

The matching of orders may occur based on a priority indicated by the characteristics of orders and market participants associated with the orders. Orders having a higher priority may be matched before orders of a lower priority. Such priority may be determined using various techniques. For example, orders that were indicated by messages received earlier may receive a higher priority to match than orders that were indicated by messages received later. Also, scoring or grading of the characteristics may provide for priority determination. Data indicative of order matches may be stored by a match engine and/or an order processing module 118, and used for determining MQI scores of market participants.

Example Users

Generally, a market may involve market makers, such as market participants who consistently provide bids and/or offers at specific prices in a manner typically conducive to balancing risk, and market takers who may be willing to execute transactions at prevailing bids or offers may be characterized by more aggressive actions so as to maintain risk and/or exposure as a speculative investment strategy. From an alternate perspective, a market maker may be considered a market participant who places an order to sell at a price at which there is no previously or concurrently provided counter order. Similarly, a market taker may be considered a market participant who places an order to buy at a price at which there is a previously or concurrently provided counter order. A balanced and efficient market may involve both market makers and market takers, coexisting in a mutually beneficial basis. The mutual existence, when functioning properly, may facilitate liquidity in the market such that a market may exist with "tight" bid-ask spreads (e.g., small difference between bid and ask prices) and a "deep" volume from many currently provided orders such that large quantity orders may be executed without driving prices significantly higher or lower.

As such, both market participant types are useful in generating liquidity in a market, but specific characteristics of market activity taken by market participants may provide an indication of a particular market participant's effect on market liquidity. For example, a Market Quality Index ("MQI") of an order may be determined using the characteristics. An MQI may be considered a value indicating a likelihood that a particular order will improve or facilitate liquidity in a market. That is, the value may indicate a likelihood that the order will increase a probability that subsequent requests and transaction from other market participants will be satisfied. As such, an MQI may be determined based on a proximity of the entered price of an order to a midpoint of a current bid-ask price spread, a size of the entered order, a volume or quantity of previously filled orders of the market participant associated with the order, and/or a frequency of modifications to previous orders of the market participant associated with the order. In this way, an electronic trading system may function to assess and/or assign an MQI to received electronic messages to establish messages that have a higher value to the system, and thus the system may use computing resources more efficiently by expending resources to match orders of the higher value messages prior to expending resources of lower value messages.

While an MQI may be applied to any or all market participants, such an index may also be applied only to a subset thereof, such as large market participants, or market participants whose market activity as measured in terms of average daily message traffic over a limited historical time period exceeds a specified number. For example, a market participant generating more than 500, 1,000, or even 10,000 market messages per day may be considered a large market participant.

An exchange provides one or more markets for the purchase and sale of various types of products including financial instruments such as stocks, bonds, futures contracts, options, currency, cash, and other similar instruments. Agricultural products and commodities are also examples of products traded on such exchanges. A futures contract is a product that is a contract for the future delivery of another financial instrument such as a quantity of grains, metals, oils, bonds, currency, or cash. Generally, each exchange establishes a specification for each market provided thereby that defines at least the product traded in the market, minimum quantities that must be traded, and minimum changes in price (e.g., tick size). For some types of products (e.g., futures or options), the specification further defines a quantity of the underlying product represented by one unit (or lot) of the product, and delivery and expiration dates. As will be described, the exchange may further define the matching algorithm, or rules, by which incoming orders will be matched/allocated to resting orders.

Matching and Transaction Processing

Market participants, e.g., traders, use software to send orders or messages to the trading platform. The order identifies the product, the quantity of the product the trader wishes to trade, a price at which the trader wishes to trade the product, and a direction of the order (i.e., whether the order is a bid, i.e., an offer to buy, or an ask, i.e., an offer to sell). It will be appreciated that there may be other order types or messages that traders can send including requests to modify or cancel a previously submitted order.

The exchange computer system monitors incoming orders received thereby and attempts to identify, i.e., match or allocate, as described herein, one or more previously received, but not yet matched, orders, i.e., limit orders to buy or sell a given quantity at a given price, referred to as "resting" orders, stored in an order book database, wherein each identified order is contra to the incoming order and has a favorable price relative to the incoming order. An incoming order may be an "aggressor" order, i.e., a market order to sell a given quantity at whatever may be the current resting bid order price(s) or a market order to buy a given quantity at whatever may be the current resting ask order price(s). An incoming order may be a "market making" order, i.e., a market order to buy or sell at a price for which there are currently no resting orders. In particular, if the incoming order is a bid, i.e., an offer to buy, then the identified order(s) will be an ask, i.e., an offer to sell, at a price that is identical to or higher than the bid price. Similarly, if the incoming order is an ask, i.e., an offer to sell, the identified order(s) will be a bid, i.e., an offer to buy, at a price that is identical to or lower than the offer price.

An exchange computing system may receive conditional orders or messages for a data object, where the order may include two prices or values: a reference value and a stop value. A conditional order may be configured so that when a product represented by the data object trades at the reference price, the stop order is activated at the stop value. For example, if the exchange computing system's order management module includes a stop order with a stop price of 5 and a limit price of 1 for a product, and a trade at 5 (i.e., the stop price of the stop order) occurs, then the exchange computing system attempts to trade at 1 (i.e., the limit price of the stop order). In other words, a stop order is a conditional order to trade (or execute) at the limit price that is triggered (or elected) when a trade at the stop price occurs.

Stop orders also rest on, or are maintained in, an order book to monitor for a trade at the stop price, which triggers an attempted trade at the limit price. In some embodiments, a triggered limit price for a stop order may be treated as an incoming order.

Upon identification (matching) of a contra order(s), a minimum of the quantities associated with the identified order and the incoming order is matched and that quantity of each of the identified and incoming orders become two halves of a matched trade that is sent to a clearing house. The exchange computer system considers each identified order in this manner until either all of the identified orders have been considered or all of the quantity associated with the incoming order has been matched, i.e., the order has been filled. If any quantity of the incoming order remains, an entry may be created in the order book database and information regarding the incoming order is recorded therein, i.e., a resting order is placed on the order book for the remaining quantity to await a subsequent incoming order counter thereto.

It should be appreciated that in electronic trading systems implemented via an exchange computing system, a trade price (or match value) may differ from (i.e., be better for the submitter, e.g., lower than a submitted buy price or higher than a submitted sell price) the limit price that is submitted, e.g., a price included in an incoming message, or a triggered limit price from a stop order.

As used herein, "better" than a reference value means lower than the reference value if the transaction is a purchase (or acquire) transaction, and higher than the reference value if the transaction is a sell transaction. Said another way, for purchase (or acquire) transactions, lower values are better, and for relinquish or sell transactions, higher values are better.

Traders access the markets on a trading platform using trading software that receives and displays at least a portion of the order book for a market, i.e., at least a portion of the currently resting orders, enables a trader to provide parameters for an order for the product traded in the market, and transmits the order to the exchange computer system. The trading software typically includes a graphical user interface to display at least a price and quantity of some of the entries in the order book associated with the market. The number of entries of the order book displayed is generally preconfigured by the trading software, limited by the exchange computer system, or customized by the user. Some graphical user interfaces display order books of multiple markets of one or more trading platforms. The trader may be an individual who trades on his/her behalf, a broker trading on behalf of another person or entity, a group, or an entity. Furthermore, the trader may be a system that automatically generates and submits orders.

If the exchange computer system identifies that an incoming market order may be filled by a combination of multiple resting orders, e.g., the resting order at the best price only partially fills the incoming order, the exchange computer system may allocate the remaining quantity of the incoming, i.e., that which was not filled by the resting order at the best price, among such identified orders in accordance with prioritization and allocation rules/algorithms, referred to as "allocation algorithms" or "matching algorithms," as, for example, may be defined in the specification of the particular financial product or defined by the exchange for multiple financial products. Similarly, if the exchange computer system identifies multiple orders contra to the incoming limit order and that have an identical price which is favorable to the price of the incoming order, i.e., the price is equal to or better, e.g., lower if the incoming order is a buy (or instruction to purchase, or instruction to acquire) or higher if the incoming order is a sell (or instruction to relinquish), than the price of the incoming order, the exchange computer system may allocate the quantity of the incoming order among such identified orders in accordance with the matching algorithms as, for example, may be defined in the specification of the particular financial product or defined by the exchange for multiple financial products.

An exchange responds to inputs, such as trader orders, cancellation, etc., in a manner as expected by the market participants, such as based on market data, e.g., prices, available counter-orders, etc., to provide an expected level of certainty that transactions will occur in a consistent and predictable manner and without unknown or unascertainable risks. Accordingly, the method by which incoming orders are matched with resting orders must be defined so that market participants have an expectation of what the result will be when they place an order or have resting orders and an incoming order is received, even if the expected result is, in fact, at least partially unpredictable due to some component of the process being random or arbitrary or due to market participants having imperfect or less than all information, e.g., unknown position of an order in an order book. Typically, the exchange defines the matching/allocation algorithm that will be used for a particular financial product, with or without input from the market participants. Once defined for a particular product, the matching/allocation algorithm is typically not altered, except in limited circumstance, such as to correct errors or improve operation, so as not to disrupt trader expectations. It will be appreciated that different products offered by a particular exchange may use different matching algorithms.

For example, a first-in/first-out (FIFO) matching algorithm, also referred to as a "Price Time" algorithm, considers each identified order sequentially in accordance with when the identified order was received. The quantity of the incoming order is matched to the quantity of the identified order at the best price received earliest, then quantities of the next earliest best price orders, and so on until the quantity of the incoming order is exhausted. Some product specifications define the use of a pro-rata matching algorithm, wherein a quantity of an incoming order is allocated to each of plurality of identified orders proportionally. Some exchange computer systems provide a priority to certain standing orders in particular markets. An example of such an order is the first order that improves a price (i.e., improves the market) for the product during a trading session. To be given priority, the trading platform may require that the quantity associated with the order is at least a minimum quantity. Further, some exchange computer systems cap the quantity of an incoming order that is allocated to a standing order on the basis of a priority for certain markets. In addition, some exchange computer systems may give a preference to orders submitted by a trader who is designated as a market maker for the product. Other exchange computer systems may use other criteria to determine whether orders submitted by a particular trader are given a preference. Typically, when the exchange computer system allocates a quantity of an incoming order to a plurality of identified orders at the same price, the trading host allocates a quantity of the incoming order to any orders that have been given priority. The exchange computer system thereafter allocates any remaining quantity of the incoming order to orders submitted by traders designated to have a preference, and then allocates any still remaining quantity of the incoming order using the FIFO or pro-rata algorithms. Pro-rata algorithms used in some markets may require that an allocation provided to a particular order in accordance with the pro-rata algorithm must meet at least a minimum allocation quantity. Any orders that do not meet or exceed the minimum allocation quantity are allocated to on a FIFO basis after the pro-rata allocation (if any quantity of the incoming order remains). More information regarding order allocation may be found in U.S. Pat. No. 7,853,499, the entirety of which is incorporated by reference herein and relied upon. Other examples of matching algorithms which may be defined for allocation of orders of a particular financial product include: Price Explicit Time; Order Level Pro Rata; Order Level Priority Pro Rata; Preference Price Explicit Time; Preference Order Level Pro Rata; Preference Order Level Priority Pro Rata; Threshold Pro-Rata; Priority Threshold Pro-Rata; Preference Threshold Pro-Rata; Priority Preference Threshold Pro-Rata; and Split Price-Time Pro-Rata, which are described in U.S. patent application Ser. No. 13/534,499, filed on Jun. 27, 2012, entitled "Multiple Trade Matching Algorithms," published as U.S. Patent Application Publication No. 2014/0006243 A1, the entirety of which is incorporated by reference herein and relied upon.

With respect to incoming orders, some traders, such as automated and/or algorithmic traders, attempt to respond to market events, such as to capitalize upon a mispriced resting order or other market inefficiency, as quickly as possible. This may result in penalizing the trader who makes an errant trade, or whose underlying trading motivations have changed, and who cannot otherwise modify or cancel their order faster than other traders can submit trades there against. It may considered that an electronic trading system that rewards the trader who submits their order first creates an incentive to either invest substantial capital in faster trading systems, participate in the market substantially to capitalize on opportunities (aggressor side/lower risk trading) as opposed to creating new opportunities (market making/higher risk trading), modify existing systems to streamline business logic at the cost of trade quality, or reduce one's activities and exposure in the market. The result may be a lesser quality market and/or reduced transaction volume, and corresponding thereto, reduced fees to the exchange.

With respect to resting orders, allocation/matching suitable resting orders to match against an incoming order can be performed, as described herein, in many different ways. Generally, it will be appreciated that allocation/matching algorithms are only needed when the incoming order quantity is less than the total quantity of the suitable resting orders as, only in this situation, is it necessary to decide which resting order(s) will not be fully satisfied, which trader(s) will not get their orders filled. It can be seen from the above descriptions of the matching/allocation algorithms, that they fall generally into three categories: time priority/first-in-first-out ("FIFO"), pro rata, or a hybrid of FIFO and pro rata.

FIFO generally rewards the first trader to place an order at a particular price and maintains this reward indefinitely. So if a trader is the first to place an order at price X, no matter how long that order rests and no matter how many orders may follow at the same price, as soon as a suitable incoming order is received, that first trader will be matched first. This "first mover" system may commit other traders to positions in the queue after the first move traders. Furthermore, while it may be beneficial to give priority to a trader who is first to place an order at a given price because that trader is, in effect, taking a risk, the longer that the trader's order rests, the less beneficial it may be. For instance, it could deter other traders from adding liquidity to the marketplace at that price because they know the first mover (and potentially others) already occupies the front of the queue.

With a pro rata allocation, incoming orders are effectively split among suitable resting orders. This provides a sense of fairness in that everyone may get some of their order filled. However, a trader who took a risk by being first to place an order (a "market turning" order) at a price may end up having to share an incoming order with a much later submitted order. Furthermore, as a pro rata allocation distributes the incoming order according to a proportion based on the resting order quantities, traders may place orders for large quantities, which they are willing to trade but may not necessarily want to trade, in order to increase the proportion of an incoming order that they will receive. This results in an escalation of quantities on the order book and exposes a trader to a risk that someone may trade against one of these orders and subject the trader to a larger trade than they intended. In the typical case, once an incoming order is allocated against these large resting orders, the traders subsequently cancel the remaining resting quantity which may frustrate other traders. Accordingly, as FIFO and pro rata both have benefits and problems, exchanges may try to use hybrid allocation/matching algorithms which attempt to balance these benefits and problems by combining FIFO and pro rata in some manner. However, hybrid systems define conditions or fixed rules to determine when FIFO should be used and when pro rata should be used. For example, a fixed percentage of an incoming order may be allocated using a FIFO mechanism with the remainder being allocated pro rata.

Spread Instruments

Traders trading on an exchange including, for example, exchange computer system 100, often desire to trade multiple financial instruments in combination. Each component of the combination may be called a leg. Traders can submit orders for individual legs or in some cases can submit a single order for multiple financial instruments in an exchange-defined combination. Such orders may be called a strategy order, a spread order, or a variety of other names.

A spread instrument may involve the simultaneous purchase of one security and sale of a related security, called legs, as a unit. The legs of a spread instrument may be options or futures contracts, or combinations of the two. Trades in spread instruments are executed to yield an overall net position whose value, called the spread, depends on the difference between the prices of the legs. Spread instruments may be traded in an attempt to profit from the widening or narrowing of the spread, rather than from movement in the prices of the legs directly. Spread instruments are either "bought" or "sold" depending on whether the trade will profit from the widening or narrowing of the spread, respectively. An exchange often supports trading of common spreads as a unit rather than as individual legs, thus ensuring simultaneous execution of the two legs, eliminating the execution risk of one leg executing but the other failing.

One example of a spread instrument is a calendar spread instrument. The legs of a calendar spread instrument differ in delivery date of the underlier. The leg with the earlier occurring delivery date is often referred to as the lead month contract. A leg with a later occurring delivery date is often referred to as a deferred month contract. Another example of a spread instrument is a butterfly spread instrument, which includes three legs having different delivery dates. The delivery dates of the legs may be equidistant to each other. The counterparty orders that are matched against such a combination order may be individual, "outright" orders or may be part of other combination orders.

In other words, an exchange may receive, and hold or let rest on the books, outright orders for individual contracts as well as outright orders for spreads associated with the individual contracts. An outright order (for either a contract or for a spread) may include an outright bid or an outright offer, although some outright orders may bundle many bids or offers into one message (often called a mass quote).

A spread is an order for the price difference between two contracts. This results in the trader holding a long and a short position in two or more related futures or options on futures contracts, with the objective of profiting from a change in the price relationship. A typical spread product includes multiple legs, each of which may include one or more underlying financial instruments. A butterfly spread product, for example, may include three legs. The first leg may consist of buying a first contract. The second leg may consist of selling two of a second contract. The third leg may consist of buying a third contract. The price of a butterfly spread product may be calculated as:

$$\text{Butterfly} = \text{Leg1} - 2 \times \text{Leg2} + \text{Leg3} \quad \text{(equation 1)}$$

In the above equation, Leg1 equals the price of the first contract, Leg2 equals the price of the second contract and Leg3 equals the price of the third contract. Thus, a butterfly spread could be assembled from two inter-delivery spreads in opposite directions with the center delivery month common to both spreads.

A calendar spread, also called an intra-commodity spread, for futures is an order for the simultaneous purchase and sale of the same futures contract in different contract months (i.e., buying a September CME S&P 500® futures contract and selling a December CME S&P 500 futures contract).

A crush spread is an order, usually in the soybean futures market, for the simultaneous purchase of soybean futures and the sale of soybean meal and soybean oil futures to establish a processing margin. A crack spread is an order for a specific spread trade involving simultaneously buying and selling contracts in crude oil and one or more derivative products, typically gasoline and heating oil. Oil refineries may trade a crack spread to hedge the price risk of their operations, while speculators attempt to profit from a change in the oil/gasoline price differential.

A straddle is an order for the purchase or sale of an equal number of puts and calls, with the same strike price and expiration dates. A long straddle is a straddle in which a long position is taken in both a put and a call option. A short straddle is a straddle in which a short position is taken in both a put and a call option. A strangle is an order for the purchase of a put and a call, in which the options have the same expiration and the put strike is lower than the call strike, called a long strangle. A strangle may also be the sale of a put and a call, in which the options have the same expiration and the put strike is lower than the call strike, called a short strangle. A pack is an order for the simultaneous purchase or sale of an equally weighted, consecutive series of four futures contracts, quoted on an average net change basis from the previous day's settlement price. Packs provide a readily available, widely accepted method for executing multiple futures contracts with a single transaction. A bundle is an order for the simultaneous sale or purchase of one each of a series of consecutive futures contracts. Bundles provide a readily available, widely accepted method for executing multiple futures contracts with a single transaction.

Implication

Thus an exchange may match outright orders, such as individual contracts or spread orders (which as discussed herein could include multiple individual contracts). The exchange may also imply orders from outright orders. For example, exchange computer system 100 may derive, identify and/or advertise, publish, display or otherwise make available for trading orders based on outright orders.

As was described above, the financial instruments which are the subject of the orders to trade, may include one or more component financial instruments. While each financial instrument may have its own order book, i.e. market, in which it may be traded, in the case of a financial instrument having more than one component financial instrument, those component financial instruments may further have their own order books in which they may be traded. Accordingly, when an order for a financial instrument is received, it may be matched against a suitable counter order in its own order book or, possibly, against a combination of suitable counter orders in the order books the component financial instruments thereof, or which share a common component financial instrument. For example, an order for a spread contract comprising component financial instruments A and B may be matched against another suitable order for that spread contract. However, it may also be matched against suitable separate counter orders for the A and for the B component financial instruments found in the order books therefore. Similarly, if an order for the A contract is received and suitable match cannot be found in the A order book, it may be possible to match order for A against a combination of a suitable counter order for a spread contract comprising the A and B component financial instruments and a suitable counter order for the B component financial instrument. This is referred to as "implication" where a given order for a financial instrument may be matched via a combination of suitable counter orders for financial instruments which share common, or otherwise interdependent, component financial instruments. Implication increases the liquidity of the market by providing additional opportunities for orders to be traded. Increasing the number of transactions may further increase the number of transaction fees collected by the electronic trading system.

The order for a particular financial instrument actually received from a market participant, whether it comprises one or more component financial instruments, is referred to as a "real" or "outright" order, or simply as an outright. The one or more orders which must be synthesized and submitted into order books other than the order book for the outright order in order to create matches therein, are referred to as "implied" orders. Upon receipt of an incoming order, the identification or derivation of suitable implied orders which would allow at least a partial trade of the incoming outright order to be executed is referred to as "implication" or "implied matching", the identified orders being referred to as an "implied match." Depending on the number component financial instruments involved, and whether those component financial instruments further comprise component financial instruments of their own, there may be numerous different implied matches identified which would allow the incoming order to be at least partially matched and mechanisms may be provided to arbitrate, e.g., automatically, among them, such as by picking the implied match comprising the least number of component financial instruments or the least number of synthesized orders.

Upon receipt of an incoming order, or thereafter, a combination of one or more suitable/hypothetical counter orders which have not actually been received but if they were received, would allow at least a partial trade of the incoming order to be executed, may be, e.g., automatically, identified or derived and referred to as an "implied opportunity." As with implied matches, there may be numerous implied opportunities identified for a given incoming order. Implied opportunities are advertised to the market participants, such as via suitable synthetic orders, e.g. counter to the desired order, being placed on the respective order books to rest (or give the appearance that there is an order resting) and presented via the market data feed, electronically communicated to the market participants, to appear available to trade in order to solicit the desired orders from the market participants. Depending on the number component financial instruments involved, and whether those component financial instruments further comprise component financial instruments of their own, there may be numerous implied opportunities, the submission of a counter order in response thereto, would allow the incoming order to be at least partially matched.

Implied opportunities, e.g. the advertised synthetic orders, may frequently have better prices than the corresponding real orders in the same contract. This can occur when two or more traders incrementally improve their order prices in the hope of attracting a trade, since combining the small improvements from two or more real orders can result in a big improvement in their combination. In general, advertising implied opportunities at better prices will encourage traders to enter the opposing orders to trade with them. The more implied opportunities that the match engine of an electronic trading system can calculate/derive, the greater this encouragement will be and the more the Exchange will benefit from increased transaction volume. However, identifying implied opportunities may be computationally intensive. In a high performance trading system where low transaction latency is important, it may be important to identify and advertise implied opportunities quickly so as to improve or maintain market participant interest and/or market liquidity.

For example, two different outright orders may be resting on the books, or be available to trade or match. The orders may be resting because there are no outright orders that match the resting orders. Thus, each of the orders may wait or rest on the books until an appropriate outright counter-offer comes into the exchange or is placed by a user of the exchange. The orders may be for two different contracts that only differ in delivery dates. It should be appreciated that such orders could be represented as a calendar spread order. Instead of waiting for two appropriate outright orders to be placed that would match the two existing or resting orders, the exchange computer system may identify a hypothetical spread order that, if entered into the system as a tradable spread order, would allow the exchange computer system to match the two outright orders. The exchange may thus advertise or make available a spread order to users of the exchange system that, if matched with a tradable spread order, would allow the exchange to also match the two resting orders. Thus, the match engine is configured to detect that the two resting orders may be combined into an order in the spread instrument and accordingly creates an implied order.

In other words, the exchange's matching system may imply the counteroffer order by using multiple orders to create the counteroffer order. Examples of spreads include implied IN, implied OUT, 2nd- or multiple-generation, crack spreads, straddle, strangle, butterfly, and pack spreads. Implied IN spread orders are derived from existing outright orders in individual legs. Implied OUT outright orders are derived from a combination of an existing spread order and an existing outright order in one of the individual underlying legs. Implied orders can fill in gaps in the market and allow spreads and outright futures traders to trade in a product where there would otherwise have been little or no available bids and asks.

For example, implied IN spreads may be created from existing outright orders in individual contracts where an outright order in a spread can be matched with other outright orders in the spread or with a combination of orders in the legs of the spread. An implied OUT spread may be created from the combination of an existing outright order in a spread and an existing outright order in one of the individual underlying leg. An implied IN or implied OUT spread may be created when an electronic match system simultaneously works synthetic spread orders in spread markets and synthetic orders in the individual leg markets without the risk to the trader/broker of being double filled or filled on one leg and not on the other leg.

By linking the spread and outright markets, implied spread trading increases market liquidity. For example, a buy in one contract month and an offer in another contract month in the same futures contract can create an implied market in the corresponding calendar spread. An exchange may match an order for a spread product with another order for the spread product. Some existing exchanges attempt to match orders for spread products with multiple orders for legs of the spread products. With such systems, every spread product contract is broken down into a collection of legs and an attempt is made to match orders for the legs.

Implied orders, unlike real orders, are generated by electronic trading systems. In other words, implied orders are computer generated orders derived from real orders. The system creates the "derived" or "implied" order and provides the implied order as a market that may be traded against. If a trader trades against this implied order, then the real orders that combined to create the implied order and the resulting market are executed as matched trades. Implied orders generally increase overall market liquidity. The creation of implied orders increases the number of tradable items, which has the potential of attracting additional traders. Exchanges benefit from increased transaction volume. Transaction volume may also increase as the number of matched trade items increases.

Examples of implied spread trading include those disclosed in U.S. Patent Publication No. 2005/0203826, entitled "Implied Spread Trading System," the entire disclosure of which is incorporated by reference herein and relied upon. Examples of implied markets include those disclosed in U.S. Pat. No. 7,039,610, entitled "Implied Market Trading System," the entire disclosure of which is incorporated by reference herein and relied upon.

In some cases, the outright market for the deferred month or other constituent contract may not be sufficiently active to provide market data (e.g., bid-offer data) and/or trade data. Spread instruments involving such contracts may nonetheless be made available by the exchange. The market data from the spread instruments may then be used to determine a settlement price for the constituent contract. The settlement price may be determined, for example, through a boundary constraint-based technique based on the market data (e.g., bid-offer data) for the spread instrument, as described in U.S. Patent Publication No. 2015/0073962 entitled "Boundary Constraint-Based Settlement in Spread Markets" ("the '962 Publication"), the entire disclosure of which is incorporated by reference herein and relied upon. Settlement price determination techniques may be implemented to cover calendar month spread instruments having different deferred month contracts.

Order Book Object Data Structures

Figure 3A:
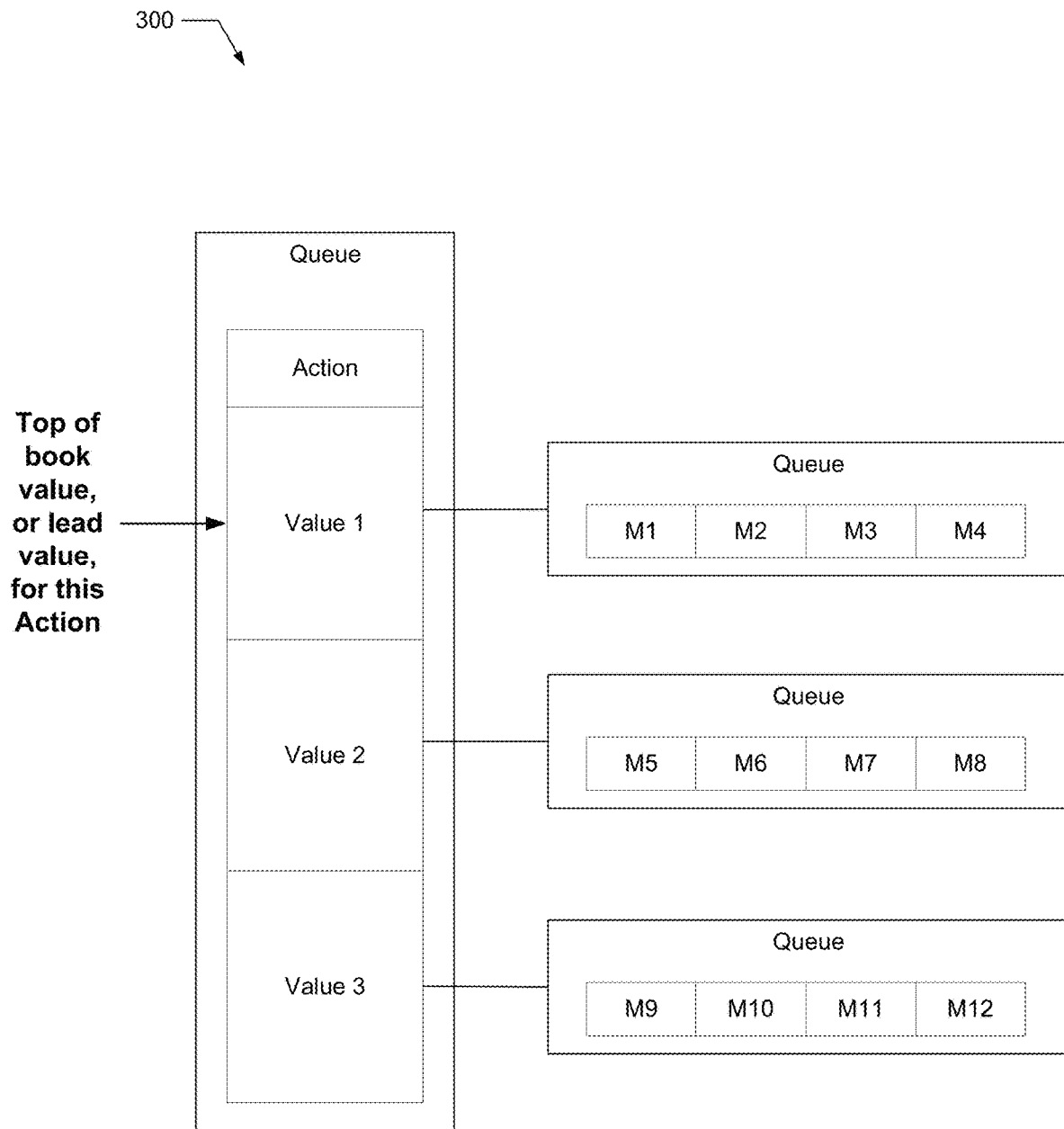
FIG. 3A depicts a storage data structure, according to some embodiments.

In one embodiment, the messages and/or values received for each object may be stored in queues according to value and/or priority techniques implemented by an exchange computing system 100. FIG. 3A illustrates an example data structure 300, which may be stored in a memory or other storage device, such as the memory 204 or storage device 206 described with respect to FIG. 2, for storing and retrieving messages related to different values for the same action for an object. For example, data structure 300 may be a set of queues or linked lists for multiple values for an action, e.g., bid, on an object. Data structure 300 may be implemented as a database. It should be appreciated that the system may store multiple values for the same action for an object, for example, because multiple users submitted messages to buy specified quantities of an object at different values. Thus, in one embodiment, the exchange computing system may keep track of different orders or messages for buying or selling quantities of objects at specified values.

Although the present patent application contemplates using queue data structures for storing messages in a memory, the implementation may involve additional pointers, i.e., memory address pointers, or linking to other data structures. Incoming messages may be stored at an identifiable memory address. The transaction processor can traverse messages in order by pointing to and retrieving different messages from the different memories. Thus, messages that may be depicted sequentially, e.g., in FIG. 3B below, may actually be stored in memory in disparate locations. The software programs implementing the transaction processing may retrieve and process messages in sequence from the various disparate (e.g., random) locations. Thus, in one embodiment, each queue may store different values, which could represent prices, where each value points to or is linked to the messages (which may themselves be stored in queues and sequenced according to priority techniques, such as prioritizing by value) that will match at that value. For example, as shown in FIG. 3A, all of the values relevant to executing an action at different values for an object are stored in a queue. Each value in turn points to, e.g., a linked list or queue logically associated with the values. The linked list stores the messages that instruct the exchange computing system to buy specified quantities of the object at the corresponding value.

The sequence of the messages in the message queues connected to each value may be determined by exchange implemented priority techniques. For example, in FIG. 3A, messages M1, M2, M3 and M4 are associated with performing an action (e.g., buying or selling) a certain number of units (may be different for each message) at Value 1. M1 has priority over M2, which has priority over M3, which has priority over M4. Thus, if a counter order matches at Value 1, the system fills as much quantity as possible associated with M1 first, then M2, then M3, and then M4.

In the illustrated examples, the values may be stored in sequential order, and the best or lead value for a given queue may be readily retrievable by and/or accessible to the disclosed system. Thus, in one embodiment, the value having the best priority may be illustrated as being in the topmost position in a queue, although the system may be configured to place the best priority message in some other predetermined position. In the example of FIG. 3A, Value 1 is shown as being the best value or lead value, or the top of the book value, for an example Action.

Figure 3B:
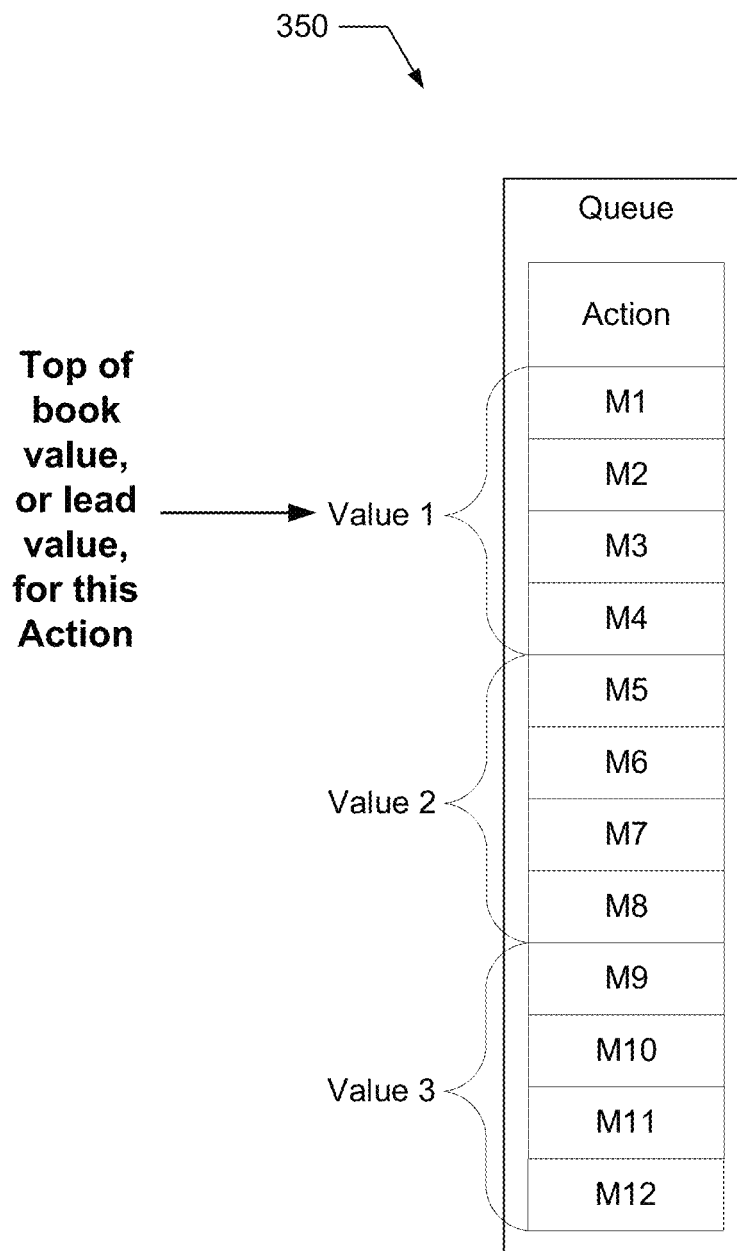
FIG. 3B depicts an alternative storage data structure, according to some embodiments.

FIG. 3B illustrates an example alternative data structure 350 for storing and retrieving messages and related values. It should be appreciated that matches occur based on values, and so all the messages related to a given value may be prioritized over all other messages related to a different value. As shown in FIG. 3B, the messages may be stored in one queue and grouped by values according to the hierarchy of the values. The hierarchy of the values may depend on the action to be performed.

For example, if a queue is a sell queue (e.g., the Action is Sell), the lowest value may be given the best priority and the highest value may be given the lowest priority. Thus, as shown in FIG. 3B, if Value 1 is lower than Value 2 which is lower than Value 3, Value 1 messages may be prioritized over Value 2, which in turn may be prioritized over Value 3.

Within Value 1, M1 is prioritized over M2, which in turn is prioritized over M3, which in turn is prioritized over M4. Within Value 2, M5 is prioritized over M6, which in turn is prioritized over M7, which in turn is prioritized over M8. Within Value 3, M9 is prioritized over M10, which in turn is prioritized over M11, which in turn is prioritized over M12.

Alternatively, the messages may be stored in a tree-node data structure that defines the priorities of the messages. In one embodiment, the messages may make up the nodes.

In one embodiment, the system may traverse through a number of different values and associated messages when processing an incoming message. Traversing values may involve the processor loading each value, checking that value and deciding whether to load another value, i.e., by accessing the address pointed at by the address pointer value. In particular, referring to FIG. 3B, if the queue is for selling an object for the listed Values 1, 2 and 3 (where Value 1 is lower than Value 2 which is lower than Value 3), and if the system receives an incoming aggressing order to buy quantity X at a Value 4 that is greater than Values 1, 2, and 3, the system will fill as much of quantity X as possible by first traversing through the messages under Value 1 (in sequence M1, M2, M3, M4). If any of the quantity of X remains, the system traverses down the prioritized queue until all of the incoming order is filled (e.g., all of X is matched) or until all of the quantities of M1 through M12 are filled. Any remaining, unmatched quantity remains on the books, e.g., as a resting order at Value 4, which was the entered value or the message's value.

The system may traverse the queues and check the values in a queue, and upon finding the appropriate value, may locate the messages involved in making that value available to the system. When an outright message value is stored in a queue, and when that outright message is involved in a trade or match, the system may check the queue for the value, and then may check the data structure storing messages associated with that value.

In one embodiment, an exchange computing system may convert all financial instruments to objects. In one embodiment, an object may represent the order book for a financial instrument. Moreover, in one embodiment, an object may be defined by two queues, one queue for each action that can be performed by a user on the object. For example, an order book converted to an object may be represented by an Ask queue and a Bid queue. Resting messages or orders associated with the respective financial instrument may be stored in the appropriate queue and recalled therefrom.

In one embodiment, the messages associated with objects may be stored in specific ways depending on the characteristics of the various messages and the states of the various objects in memory. For example, a system may hold certain resting messages in queue until the message is to be processed, e.g., the message is involved in a match. The order, sequence or priority given to messages may depend on the characteristics of the message. For example, in certain environments, messages may indicate an action that a computer in the system should perform. Actions may be complementary actions, or require more than one message to complete. For example, a system may be tasked with matching messages or actions contained within messages. The messages that are not matched may be queued by the system in a data queue or other structure, e.g., a data tree having nodes representing messages or orders.

The queues are structured so that the messages are stored in sequence according to priority. Although the embodiments are disclosed as being implemented in queues, it should be understood that different data structures such as for example linked lists or trees may also be used.

The system may include separate data structures, e.g., queues, for different actions associated with different objects within the system. For example, in one embodiment, the system may include a queue for each possible action that can be performed on an object. The action may be associated with a value. The system prioritizes the actions based in part on the associated value.

Figure 3C:
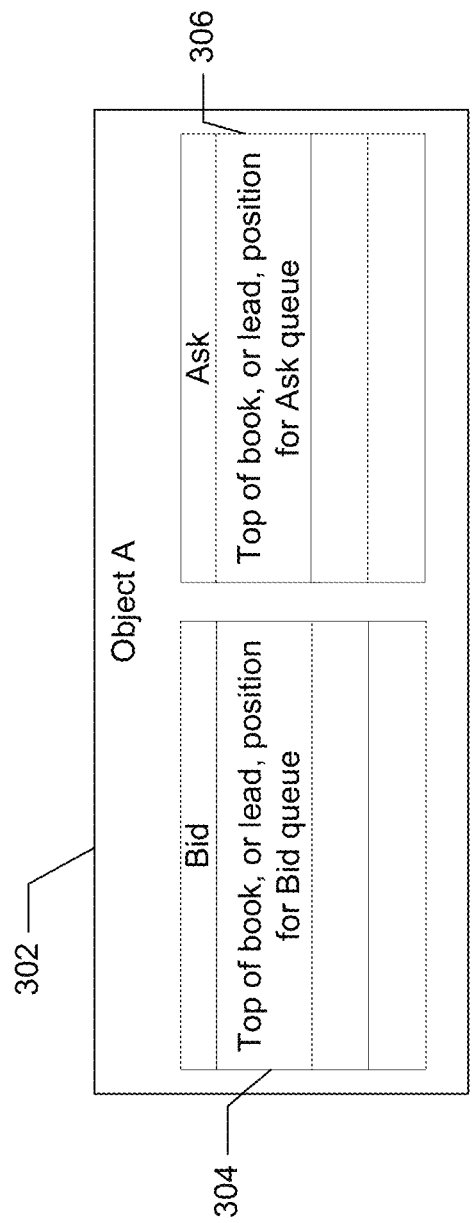
FIG. 3C depicts an order book data structure, according to some embodiments.

For example, as shown in FIG. 3C, the order book module of a computing system may include several paired queues, such as queues Bid and Ask for an object 302 (e.g., Object A). The system may include two queues, or one pair of queues, for each object that is matched or processed by the system. In one embodiment, the system stores messages in the queues that have not yet been matched or processed. FIG. 3C may be an implementation of the data structures disclosed in FIGS. 3A and/or 3B. Each queue may have a top of book, or lead, position, such as positions 304 and 306, which stores data that is retrievable.

The queues may define the priority or sequence in which messages are processed upon a match event. For example, two messages stored in a queue may represent performing the same action at the same value. When a third message is received by the system that represents a matching action at the same value, the system may need to select one of the two waiting, or resting, messages as the message to use for a match. Thus, when multiple messages can be matched at the same value, the exchange may have a choice or some flexibility regarding the message that is matched. The queues may define the priority in which orders that are otherwise equivalent (e.g., same action for the same object at the same value) are processed.

The system may include a pair of queues for each object, e.g., a bid and ask queue for each object. Each queue may be for example implemented utilizing the data structure of FIG. 3B. The exchange may be able to specify the conditions upon which a message for an object should be placed in a queue. For example, the system may include one queue for each possible action that can be performed on an object. The system may be configured to process messages that match with each other. In one embodiment, a message that indicates performing an action at a value may match with a message indicating performing a corresponding action at the same value. Or, the system may determine the existence of a match when messages for the same value exist in both queues of the same object. The messages may be received from the same or different users or traders.

The queues illustrated in FIG. 3C hold or store messages received by a computing exchange, e.g., messages submitted by a user to the computing exchange, and waiting for a proper match. It should be appreciated that the queues may also hold or store implieds, e.g., implied messages generated by the exchange system, such as messages implied in or implied out as described herein. The system thus adds messages to the queues as they are received, e.g., messages submitted by users, or generated, e.g., implied messages generated by the exchanges. The sequence or prioritization of messages in the queues is based on information about the messages and the overall state of the various objects in the system.

When the data transaction processing system is implemented as an exchange computing system, as discussed above, different client computers submit electronic data transaction request messages to the exchange computing system. Electronic data transaction request messages include requests to perform a transaction on a data object, e.g., at a value for a quantity. The exchange computing system includes a transaction processor, e.g., a hardware matching processor or match engine, that matches, or attempts to match, pairs of messages with each other. For example, messages may match if they contain counter instructions (e.g., one message includes instructions to buy, the other message includes instructions to sell) for the same product at the same value. In some cases, depending on the nature of the message, the value at which a match occurs may be the submitted value or a better value. A better value may mean higher or lower value depending on the specific transaction requested. For example, a buy order may match at the submitted buy value or a lower (e.g., better) value. A sell order may match at the submitted sell value or a higher (e.g., better) value.

Transaction Processor Data Structures

Figure 4:
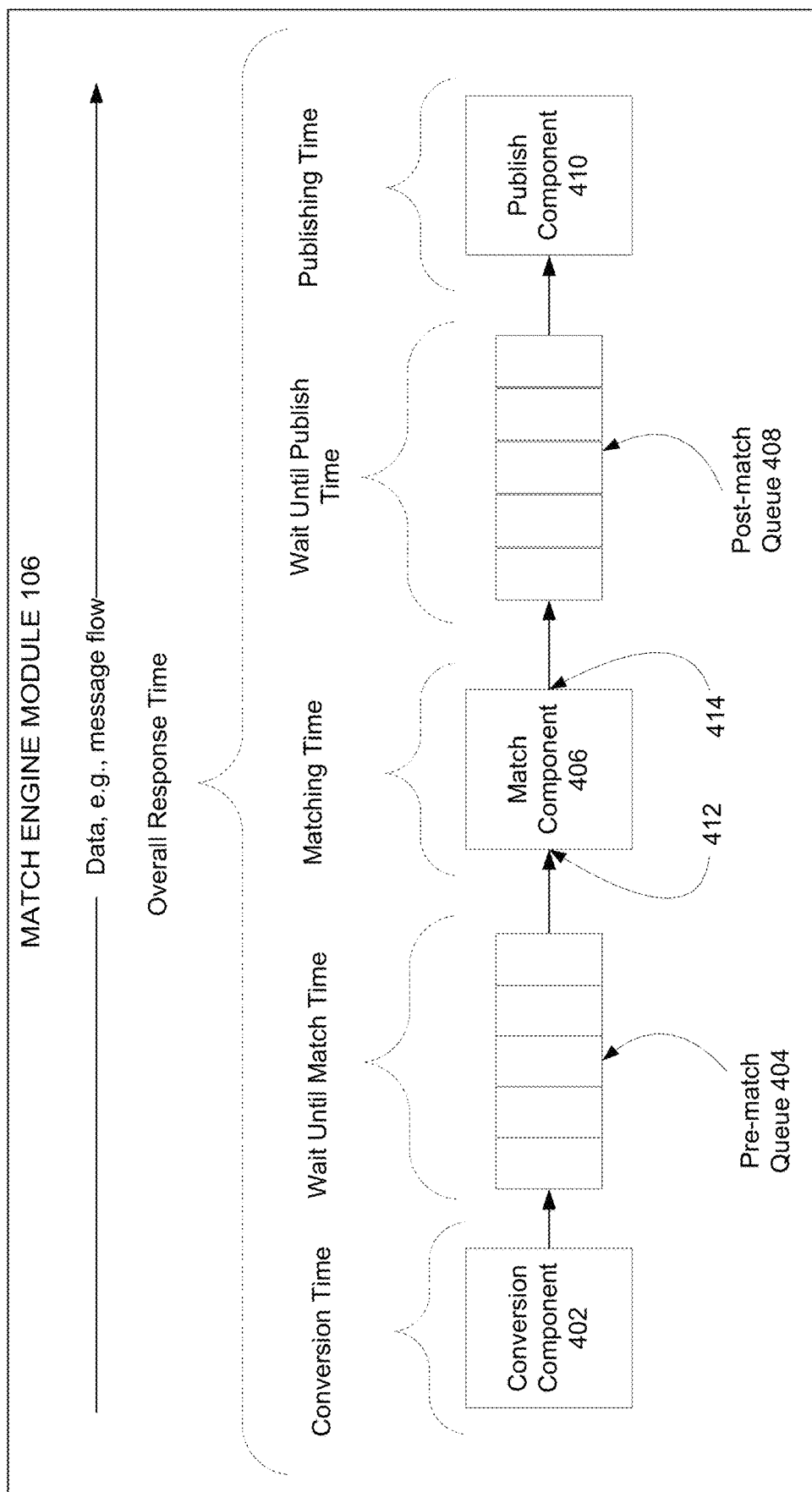
FIG. 4 depicts a match engine module, according to some embodiments.

FIG. 4 illustrates an example embodiment of a data structure used to implement match engine module 106. Match engine module 106 may include a conversion component 402, pre-match queue 404, match component 406, post-match queue 408 and publish component 410.

Although the embodiments are disclosed as being implemented in queues, it should be understood that different data structures, such as for example linked lists or trees, may also be used. Although the application contemplates using queue data structures for storing messages in a memory, the implementation may involve additional pointers, i.e., memory address pointers, or linking to other data structures. Thus, in one embodiment, each incoming message may be stored at an identifiable memory address. The transaction processing components can traverse messages in order by pointing to and retrieving different messages from the different memories. Thus, messages that may be processed sequentially in queues may actually be stored in memory in disparate locations. The software programs implementing the transaction processing may retrieve and process messages in sequence from the various disparate (e.g., random) locations.

The queues described herein may, in one embodiment, be structured so that the messages are stored in sequence according to time of receipt, e.g., they may be first in first out (FIFO) queues.

The match engine module 106 may be an example of a transaction processing system. The pre-match queue 404 may be an example of a pre-transaction queue. The match component 406 may be an example of a transaction component. The post-match queue 408 may be an example of a post-transaction queue. The publish component 410 may be an example of a distribution component. The transaction component may process messages and generate transaction component results.

In one embodiment, the publish component may be a distribution component that can distribute data to one or more market participant computers. In one embodiment, match engine module 106 operates according to a first in, first out (FIFO) ordering. The conversion component 402 converts or extracts a message received from a trader via the Market Segment Gateway or MSG into a message format that can be input into the pre-match queue 404.

Messages from the pre-match queue may enter the match component 406 sequentially and may be processed sequentially. In one regard, the pre-transaction queue, e.g., the pre-match queue, may be considered to be a buffer or waiting spot for messages before they can enter and be processed by the transaction component, e.g., the match component. The match component matches orders, and the time a messages spends being processed by the match component can vary, depending on the contents of the message and resting orders on the book. Thus, newly received messages wait in the pre-transaction queue until the match component is ready to process those messages. Moreover, messages are received and processed sequentially or in a first-in, first-out FIFO methodology. The first message that enters the pre-match or pre-transaction queue will be the first message to exit the pre-match queue and enter the match component. In one embodiment, there is no out-of-order message processing for messages received by the transaction processing system. The pre-match and post-match queues are, in one embodiment, fixed in size, and any messages received when the queues are full may need to wait outside the transaction processing system or be re-sent to the transaction processing system.

The match component 406 processes an order or message, at which point the transaction processing system may consider the order or message as having been processed. The match component 406 may generate one message or more than one message, depending on whether an incoming order was successfully matched by the match component. An order message that matches against a resting order in the order book may generate dozens or hundreds of messages. For example, a large incoming order may match against several smaller resting orders at the same price level. For example, if many orders match due to a new order message, the match engine needs to send out multiple messages informing traders which resting orders have matched. Or, an order message may not match any resting order and only generate an acknowledgement message. Thus, the match component 406 in one embodiment will generate at least one message, but may generate more messages, depending upon the activities occurring in the match component. For example, the more orders that are matched due to a given message being processed by the match component, the more time may be needed to process that message. Other messages behind that given message will have to wait in the pre-match queue.

Messages resulting from matches in the match component 406 enter the post-match queue 408. The post-match queue may be similar in functionality and structure to the pre-match queue discussed above, e.g., the post-match queue is a FIFO queue of fixed size. As illustrated in FIG. 4, a difference between the pre- and post-match queues may be the location and contents of the structures, namely, the pre-match queue stores messages that are waiting to be processed, whereas the post-match queue stores match component results due to matching by the match component. The match component receives messages from the pre-match queue, and sends match component results to the post-match queue. In one embodiment, the time that results messages, generated due to the transaction processing of a given message, spend in the post-match queue is not included in the latency calculation for the given message.

Messages from the post-match queue 408 enter the publish component 410 sequentially and are published via the MSG sequentially. Thus, the messages in the post-match queue 408 are an effect or result of the messages that were previously in the pre-match queue 404. In other words, messages that are in the pre-match queue 404 at any given time will have an impact on or affect the contents of the post-match queue 408, depending on the events that occur in the match component 406 once the messages in the pre-match queue 404 enter the match component 406.

As noted above, the match engine module 106 in one embodiment operates in a first in first out (FIFO) scheme. In other words, the first message that enters the match engine module 106 is the first message that is processed by the match engine module 106. Thus, the match engine module 106 in one embodiment processes messages in the order the messages are received. In FIG. 4, as shown by the data flow arrow, data is processed sequentially by the illustrated structures from left to right, beginning at the conversion component 402, to the pre-match queue, to the match component 406, to the post-match queue 408, and to the publish component 410. The overall transaction processing system operates in a FIFO scheme such that data flows from element 402 to 404 to 406 to 408 to 410, in that order. If any one of the queues or components of the transaction processing system experiences a delay, that creates a backlog for the structures preceding the delayed structure. For example, if the match or transaction component is undergoing a high processing volume, and if the pre-match or pre-transaction queue is full of messages waiting to enter the match or transaction component, the conversion component may not be able to add any more messages to the pre-match or pre-transaction queue.

Messages wait in the pre-match queue. The time a message waits in the pre-match queue depends upon how many messages are ahead of that message (i.e., earlier messages), and how much time each of the earlier messages spends being serviced or processed by the match component. Messages also wait in the post-match queue. The time a message waits in the post-match queue depends upon how many messages are ahead of that message (i.e., earlier messages), and how much time each of the earlier messages spends being serviced or processed by the publish component. These wait times may be viewed as a latency that can affect a market participant's trading strategy.

After a message is published (after being processed by the components and/or queues of the match engine module), e.g., via a market data feed, the message becomes public information and is publicly viewable and accessible. Traders consuming such published messages may act upon those message, e.g., submit additional new input messages to the exchange computing system responsive to the published messages.

The match component attempts to match aggressing or incoming orders against resting orders. If an aggressing order does not match any resting orders, then the aggressing order may become a resting order, or an order resting on the books. For example, if a message includes a new order that is specified to have a one-year time in force, and the new order does not match any existing resting order, the new order will essentially become a resting order to be matched (or attempted to be matched) with some future aggressing order. The new order will then remain on the books for one year. On the other hand, an order specified as a fill or kill (e.g., if the order cannot be filled or matched with an order currently resting on the books, the order should be canceled) will never become a resting order, because it will either be filled or matched with a currently resting order, or it will be canceled. The amount of time needed to process or service a message once that message has entered the match component may be referred to as a service time. The service time for a message may depend on the state of the order books when the message enters the match component, as well as the contents, e.g., orders, that are in the message.

In one embodiment, orders in a message are considered to be "locked in", or processed, or committed, upon reaching and entering the match component. If the terms of the aggressing order match a resting order when the aggressing order enters the match component, then the aggressing order will be in one embodiment guaranteed to match.

As noted above, the latency experienced by a message, or the amount of time a message spends waiting to enter the match component, depends upon how many messages are ahead of that message (i.e., earlier messages), and how much time each of the earlier messages spends being serviced or processed by the match component. The amount of time a match component spends processing, matching or attempting to match a message depends upon the type of message, or the characteristics of the message. The time spent inside the processor may be considered to be a service time, e.g., the amount of time a message spends being processed or serviced by the processor.

The number of matches or fills that may be generated in response to a new order message for a financial instrument will depend on the state of the data object representing the electronic marketplace for the financial instrument. The state of the match engine can change based on the contents of incoming messages.

It should be appreciated that the match engine's overall latency is in part a result of the match engine processing the messages it receives. The match component's service time may be a function of the message type (e.g., new, modify, cancel), message arrival rate (e.g., how many orders or messages is the match engine module receiving, e.g., messages per second), message arrival time (e.g., the time a message hits the inbound MSG or market segment gateway), number of fills generated (e.g., how many fills were generated due to a given message, or how many orders matched due to an aggressing or received order), or number of Mass Quote entries (e.g., how many of the entries request a mass quote).

In one embodiment, the time a message spends:

Being converted in the conversion component 402 may be referred to as a conversion time;

Waiting in the pre-match queue 404 may be referred to as a wait until match time;

Being processed or serviced in the match component 406 may be referred to as a matching time;

Waiting in the post-match queue 408 may be referred to as a wait until publish time; and Being processed or published via the publish component 410 may be referred to as a publishing time.

It should be appreciated that the latency may be calculated, in one embodiment, as the sum of the conversion time and wait until match time. Or, the system may calculate latency as the sum of the conversion time, wait until match time, matching time, wait until publish time, and publishing time. In systems where some or all of those times are negligible, or consistent, a measured latency may only include the sum of some of those times. Or, a system may be designed to only calculate one of the times that is the most variable, or that dominates (e.g., percentage wise) the overall latency. For example, some market participants may only care about how long a newly sent message that is added to the end of the pre-match queue will spend waiting in the pre-match queue. Other market participants may care about how long that market participant will have to wait to receive an acknowledgement from the match engine that a message has entered the match component. Yet other market participants may care about how much time will pass from when a message is sent to the match engine's conversion component to when match component results exit or egress from the publish component.

Monitoring System Data Store

A data store contains information, e.g., data entries, recorded thereon by a monitoring system that monitors processing of messages in a data transaction processing system. The monitoring system may be implemented to measure the performance of a computer system, such as a match engine of an electronic trading system, whereby multiple threads, processes or other programs, referred to as "loggers" or "logging threads", monitor various portions of the operation of the computer system and record, e.g., periodically, their observations, and/or other data indicative thereof, in a log data file or other data structure. The monitoring system may be implemented by multiple operating processes, threads, tasks or other computer program code construct, logically distributed or otherwise coupled throughout the exchange computer system 100 to monitor different parts, e.g. modules, thereof and record data regarding the operation thereof in a log file or other data store. The data store may include one or more data files, records or other structures or resources for storing data.

The messages processed by the monitored system, e.g., an application, may be referred to as transactions. It should be appreciated that the more granular the monitoring, i.e. the more monitoring threads/process that can be implemented to monitor more parts of the system and/or the rate or frequency at which those parts may be monitored and data indicative thereof recorded, the more useful the overall monitoring function may be. Each thread/process may be monitoring a different portion of the system and the computer system may be operating at high speed, thereby generating a significant amount of monitored data in a short amount of time, all of which may be written by multiple threads to a same file or data store.

In one embodiment, the monitored system may comprise a match engine of an electronic trading system and the monitoring threads/processes may continuously monitor and record time stamp and data about the location in the code, which may be checkpoint data, indicative of or based on the timing of particular operations/functions/milestones/states of the system for the purpose of system performance evaluation, problem/defect resolutions, historical data analysis, operational scenario reconstruction, regulatory or administrative audit, or other purpose. The disclosed embodiments may be utilized in conjunction with any system or multi-threaded implementation that enables multiple processes/threads to append data to a shared resource, e.g. file or other data store, such as U.S. patent application Ser. No. 15/663,360 entitled "Concurrent Write Operations For Use With Multi-Threaded File Logging" and filed on Jul. 28, 2017 ("the '360 application"), assigned to the assignee of the present application, the entire disclosure of which is incorporated by reference herein and relied upon.

The application may be a software application. An application may be implemented as software code, where different portions of the code may be identifiable as, for example, different line numbers.

In one embodiment, a checkpoint may be one or more lines in the code that instructs or causes the application to store information in a data store, such as data store 510, such as code which implements or calls a data storage operation.

For example, referring back to FIG. 4, an application or module, such as the match engine module 106, may include checkpoints 412 and 414.

A checkpoint inserted at a point or line in the code may include or be identifiable as a checkpoint name. For example, checkpoint 412 may be named a start checkpoint, or be named "pre-match component checkpoint". When the checkpoint data is logged to the file, the logged data may list the time a message reached the checkpoint called "pre-match component checkpoint".

A message progresses through the code associated with the application. When a message traverses a checkpoint, such as checkpoints 412 or 414, the monitoring system logs information about the occurrence of the traversal event by recording data indicative of the message, the checkpoint name, and a timestamp associated with the occurrence of the event.

A monitoring system may store, i.e. append, data, such as log data, in a selected one of at least one data store 510 discussed below, e.g. a data file or other data storage construct, and may be coupled with a processor, such as processor 202. The selected one of the at least one data store 510 may be stored in a memory 204 or elsewhere. The processor 202, memory 204 and/or data store 510 may be implemented by a processor 202 and memory 204 as described herein with respect to FIG. 2.

In one embodiment, the checkpoints may be implemented via a separate, supervisory, thread/process that watches the progress of a message through the code and, upon the message traversing a certain point in the code, may log information about the state of the system at that time.

Database Performance Based Indexing

After the data is collected/logged in the data store, the data can be queried, such as by a performance analysis tool. However, in a high volume data transaction processing system that records transaction details for many transactions, the size of the data store can drastically slow down query response time. A typical reason for poor query response time is the large size of a data store being queried.

For example, an exchange computing system application, e.g., a match engine module, may process hundreds of millions of messages a day. The application may include many checkpoints, where, as discussed above, a data entry may be recorded each time a message traverses a checkpoint. Such a large volume of data, while very useful for performance analysis, can severely slow down query response times.

The disclosed performance measurement indexing system determines, during a post-processing phase, which portions of the application, e.g., based on the data entries recorded in the data store, are bottlenecked.

Figure 5:
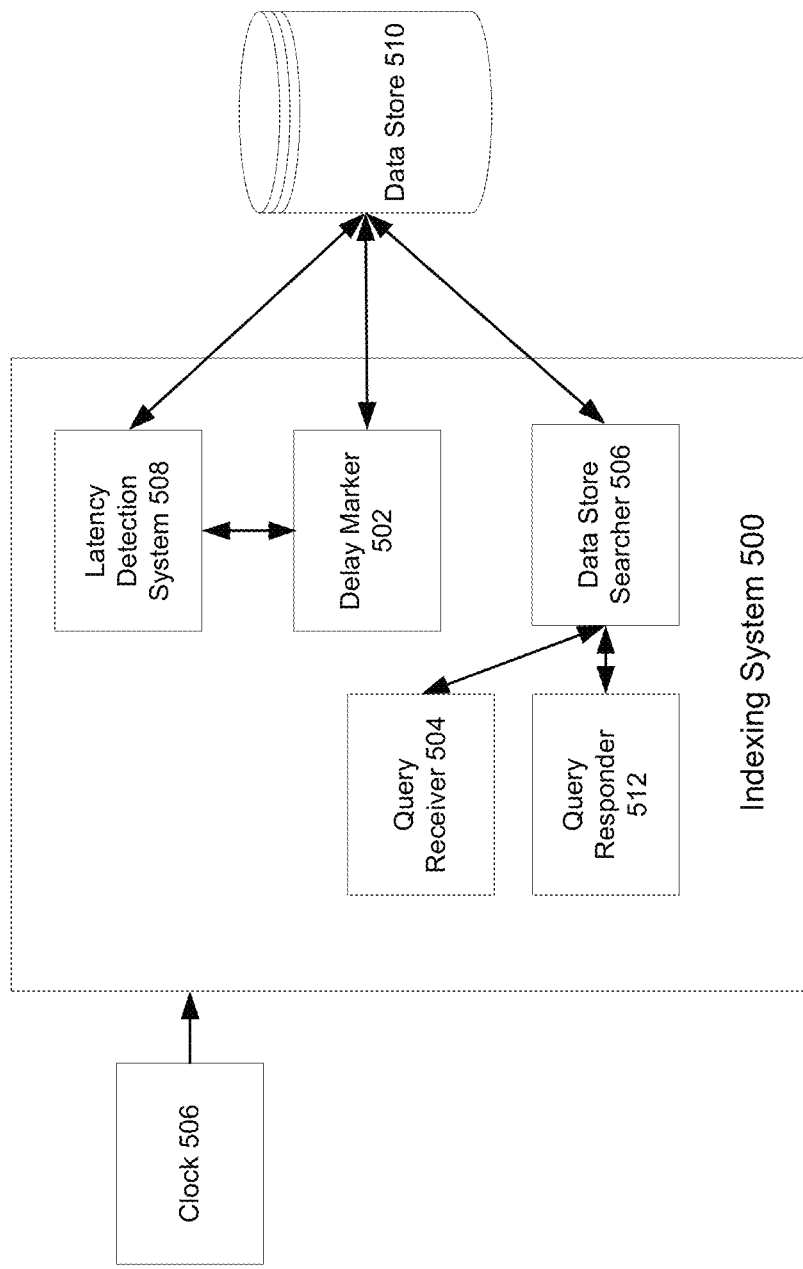
FIG. 5 depicts an indexing system implemented in a data transaction processing system, according to some embodiments.

FIG. 5 illustrates an example performance measurement indexing system 500, which in one embodiment is implemented as part of the exchange computer system 100 described herein. In particular, FIG. 5 shows a system 500 for indexing a data store including data indicative of message processing by an application 512 in a data transaction processing system. Application 512 may be an application such as match engine module 106.

The indexing system 500 includes a latency detection system 508 which may be implemented as a separate hardware component or as logic stored in the memory 204 and executable by the processor 202 to cause the processor 202 to determine whether one or more portions of the application is experiencing a delay. Whether or not a portion of the application is undergoing or experiencing a delay may be defined in a variety of ways. It should be appreciated that the latency detection system 508 retrieves information about message processing based on how a delay is defined within the system.

Although the application contemplates measuring latency between checkpoints, the disclosed embodiments may rely on or use jitter measurements (i.e., latency variation), bandwidth consumed versus utilized, or message throughput (raw number of messages being processed per unit of time), instead of latency measurement, to modify a data store containing performance measurement data entries as discussed herein.

An application may include different stages, which may be different functions or processes executed by the code. A message may skip a stage, or portions, of the code, depending on the results of a previous/earlier stage. Stages may be identified by a beginning and an end checkpoint of that stage. An application developer may place checkpoints in the code that define, or form boundaries, around stages. For example, referring to FIG. 6, application 600 in FIG. 6 includes application stage 1 (defined by checkpoints 602 and 608), stage 2 (defined by checkpoints 610 and 616), and stage 3 (defined by checkpoints 618 and 624).

For example, a portion/stage of the application may be defined as undergoing or experiencing a delay if the amount of time that elapses for a message to traverse checkpoints defining that portion exceeds a predefined, threshold amount of time. Referring back to FIG. 5, the latency detection system 508 detects the latency or time elapse between processing of messages between any two of the checkpoints in the application 512. For example, in an application that includes four checkpoints A, B, C and D, the latency detection system 508 may determine the amount of time elapsed between a message traversing checkpoint A and the same message traversing checkpoint B. The latency detection system 508 may determine the amount of time elapsed between a message traversing any two of the checkpoints in the application. In one embodiment, the latency detection system 508 may additionally compare the latency (or elapsed time) between a message traversing two of the checkpoints with an expected latency threshold for the same two checkpoints. For example, the expected latency threshold for checkpoint pair AB may be 5 microseconds. If the actual latency experienced by a message, e.g., the amount of time elapsed, between the message traversing checkpoints A and B exceeds 5 microseconds, the latency detection system 508 may conclude or detect that checkpoint pair AB is delayed.

In one embodiment, a portion/stage of the application may be defined as undergoing or experiencing a delay if the amount of time that elapses for a message to traverse checkpoints defining that portion is higher than the amount of time that elapses for a message to traverse checkpoints defining other portions, e.g., application stages. The latency detection system 508 may determine whether the time elapsed between checkpoints A and B is a disproportionally high percentage of the overall time needed for a message to be processed by the application. Thus, the latency detection system 508 may use a relative comparison of the amount of time that elapses as a message is processed through the different stages. The stage, i.e., a portion of the application defined by checkpoints, that requires the most amount of time to process a message is determined to be experiencing a delay, or is determined to be a bottleneck in the application.

In one embodiment, a portion/stage of the application may be defined as undergoing or experiencing a delay if the amount of time that elapses for a message to be serviced/processed by that stage of the application is more than an amount of time between new messages arriving to that stage. In other words, the arrival rate of messages to a stage may exceed the per message processing time for that stage. For example, a stage may receive a new message to process each microsecond, but require 2 microseconds to process a message. That stage may then be defined to be undergoing a delay, because the service time of that stage is greater than the arrival rate of messages to that stage.

In one embodiment, a portion/stage of the application may be defined as undergoing or experiencing a delay if the number of messages waiting to be serviced/processed by that stage of the application, i.e., the queue depth, exceeds a predefined, threshold number of messages. For example, referring back to FIG. 4, if the match component 406 is a stage of the match engine module 106 application, the pre-match queue 404 holds messages that are waiting to be serviced by the match component 406. If the pre-match queue contains more messages than a threshold amount of messages, the match component 406 may be considered to be experiencing a delay.

It should be appreciated that the conditions that define whether a portion of the application is undergoing a delay may be configurable by a user. In one embodiment, the monitoring system increases the number of checkpoints within a portion determined to be experiencing a delay, so that more data is collected from such portions and specific problem portions of the application can be further analyzed and potentially mitigated, e.g., by providing more resources to bottlenecked components, by testing the portion of the code for race conditions/memory leaks, etc.

The latency detection system 508 may be a component of the indexing system. In one embodiment, the latency detection system 508 may be a separate component outside of the indexing system.

It should also be appreciated that an application 512 may be processing many different messages at the same time. Thus, different messages may be at different stages within the code at the same time. For example, concurrent logging of multi-threaded applications is discussed in further detail in the '360 application. Thus, the data writer 504 may continuously be writing data related to different messages to the data store 510. The message processing latency determined by the latency detection system 508 is based on the time elapsed between one message, i.e., the same message, traversing two different checkpoints.

The latency detection system 508 may, in one embodiment, read data from the data store 510 to determine whether checkpoint pairs are experiencing a higher than expected latency.

In one embodiment, the latency detection system 508 may only determine the message processing latencies between checkpoints in checkpoint pairs defining stages. For example, the latency detection system 508 may determine the message processing latencies between checkpoints 602 and 608 (which define stage 1 of application 600), checkpoints 610 and 616 (which define stage 2 of application 600), and checkpoints 618 and 624 (which define stage 3 of application 600). In one embodiment, the checkpoint pairs between which the latency detection system 508 may determine message processing latencies is configurable by a user.

The message processing latency for a given stage may be determined based on the time required/elapsed for a message, or the average time required/elapsed for a plurality of messages, to travel from one checkpoint defining a beginning of the stage to the other checkpoint defining an end of the stage. The latency detection system 508 may determine that stage 3 is experiencing a delay that exceeds a predetermined expected latency threshold. The predetermined expected latency thresholds for the different stages may be based on historical performance of messages that were previously processed by the stages.

Or, the latency detection system 508 may detect that stage 3 is a bottleneck in the code because of the time needed/elapsed for one or more messages to be processed through the stage. In software engineering, application performance improvement can be achieved by reducing overall message processing latency. If additional data points/data entries are collected from the stage that requires the most time to process, that stage can be analyzed, better understood, and performance thereof can thereby be improved, which in turn can reduce overall message processing latency of an application.

The indexing system 500 includes a delay marker 502 which may be implemented as a separate hardware component or as logic stored in the memory 204 and executable by the processor 202 to cause the processor 202 to mark, e.g., with a flag, portions of the data entries defined by the latency detection system 508 as being unexpectedly delayed, or congested. The thresholds that are used to determine whether the message processing latency between a checkpoint pair constitutes an unexpected delay, such that the data entries associated with the checkpoint pair are included in subsequent performance analysis tool queries. For example, a bottleneck may be detected based on the interval of time, or the time elapsed, between a message traversing two checkpoints.

The indexing system 500 includes a query receiver 504 which may be implemented as a separate hardware component or as logic stored in the memory 204 and executable by the processor 202 to cause the processor 202 to receive a query to search the data store 510. A user may query the data store for performance analysis. For example, a user may implement a performance analysis tool to query the data store for percentiles associated with message processing. Or, a user may query the data store for performance of an application stage over time. A performance analysis tool may include an option, such as a checkbox, that when checked, limits the field of a query to areas of the application that were experiencing a delay, as determined/defined by the latency detection system. Such a query that limits the field of a query to areas of the application that were experiencing a delay may be referred to as a bottleneck limited query.

The indexing system 500 includes a data store searcher 506 which may be implemented as a separate hardware component or as logic stored in the memory 204 and executable by the processor 202 to cause the processor 202 to identify, and only search, portions of the data entries marked as being delayed by the delay marker 502.

The indexing system 500 includes a data store searcher 506 which may be implemented as a separate hardware component or as logic stored in the memory 204 and executable by the processor 202 to cause the processor 202 to identify, and only search, portions of the data entries marked as being delayed by the delay marker 502.

The indexing system 500 includes a query responder 512 which may be implemented as a separate hardware component or as logic stored in the memory 204 and executable by the processor 202 to cause the processor 202 to generate responses to queries received by the query receiver 504. For example, the indexing system may supply a response to a client computer that submitted, e.g., via a performance analysis tool, a query to search the data store 510. The response may be performance data about message processing by an application. The performance analysis tool may visually summarize performance data as timeseries and percentile distributions.

Figure 6:
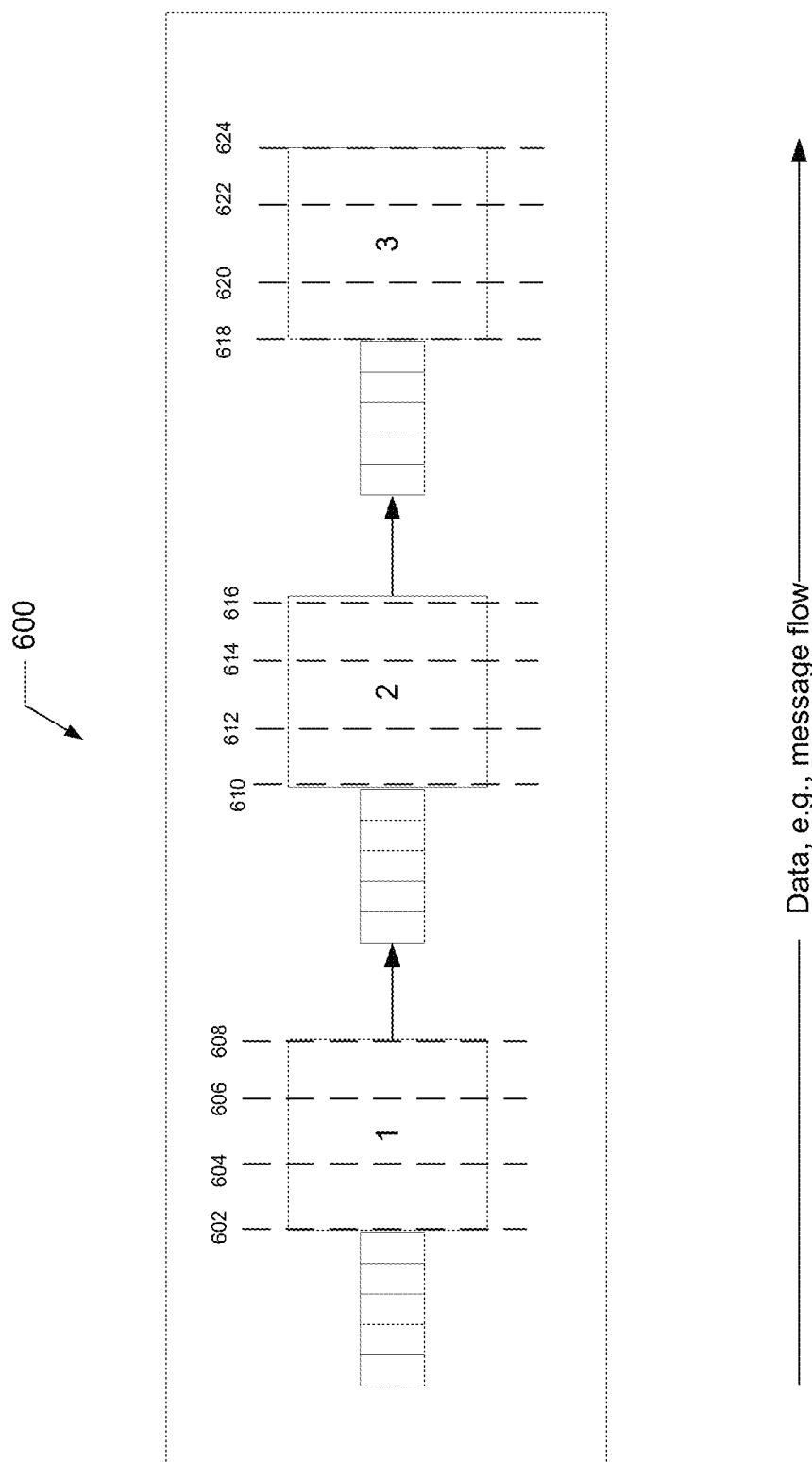
FIG. 6 depicts an example application including a plurality of checkpoints, according to some embodiments.

For example, referring back to the example of FIG. 6 discussed above, based on the determination that stage 3 is a bottleneck in the application, or is experiencing a higher than expected delay, the delay marker 502 may flag or mark checkpoint pair 618, 624 as delayed, or may modify the data entries associated with checkpoint pair 618, 624 by adding data indicative of a delay. When a bottleneck limited query is run on the data store 510, only checkpoints that are marked as delayed appear in the search results. In one embodiment, all checkpoints that fall within a delayed checkpoint pair appear in the results in response to a bottleneck limited query. For example, in one embodiment, a user may use a performance analysis tool to query for performance measurements that occur within a specific time window. If the performance analysis tool limits the query to bottlenecked areas only, only results that occurred between checkpoint pair 618 and 624 are returned to the user. Measurements within the specified time window but related to other stages, e.g., stages 1 and 2, are not searched or returned. Because data entries/measurements from checkpoints associated with stages 1 and 2 are not searched, the performance measurement indexing system enables a much faster query response time.

In one embodiment, all of the checkpoints that appear between delayed checkpoints are included in the results. For example, if checkpoint pair 618, 624 is marked as delayed, but checkpoint pair 620, 622 is not marked as delayed, a bottleneck limited query may search for and return related to all of the checkpoints within stage 3, namely, 618, 620, 622 and 624.

In one embodiment, the performance measurement indexing system may allow a user to set more than one delay condition for an application. For example, a user/software developer may set high and low urgency levels for delay conditions for stages in an application. For example, referring back to FIG. 6, a developer may set two delay conditions for the stages in application 600: 7 microseconds (high urgency) and 4 microseconds (low urgency). The delay marker 502 marks checkpoint pairs as high or low urgency based on the amount of time recorded for message processing latency between each stage defining checkpoint pair in application 600. Delay marker 502 accordingly does not mark stage 1 at all, marks stage 2 as low urgency and marks stage 3 as high urgency. When a user queries data store's data entries associated with application 600 using a performance analysis tool, the user may be able to query for high and low urgency measurements. High urgency limited queries only search for data with stage 3, whereas low urgency limited queries only search for data within stages 2 and 3.

In one embodiment, the monitoring system may reuse identifiers to reduce the amount of data that is collected, as described in U.S. patent application Ser. No. 15/691,052 entitled "Compressed Message Tracing and Parsing" and filed on Aug. 30, 2017 ("the '052 application"), assigned to the assignee of the present application, the entire disclosure of which is incorporated by reference herein and relied upon. If the monitoring system reuses identifiers as described in, the indexing system parses, e.g., during post-processing, or after a message has been processed by the application, the data structure to determine tracer entries associated with the same message for performance analysis of the progress of the message through the code by identifying special markers or checkpoints traversed by the message. For example, the indexing system may parse the data store 510 as described in the '052 application.

It should be appreciated that it may not be feasible or desirable to analyze the data entries stored in the log file until a later time, e.g., when the system is no longer accepting messages. For example, in an exchange computing system, the logged data may not be reviewed for performance analysis until the end of the trading day, after the exchange computing system stops accepting new messages. Thus, while the data store is recording information about the plurality of messages, it may not be efficient for an analysis tool to read the recorded data, for performance analysis of messages within the code. Accordingly, the indexing system may index the data store when the data store is not actively storing new information. Alternatively, the indexing system may index the data store as the application 600 is processing new messages. In one embodiment, the indexing system only needs to be able to calculate message processing latencies between checkpoints in checkpoint pairs to determine if a checkpoint should be flagged, as discussed herein.

FIG. 7A illustrates an example data store 700 including data entries, e.g., data entries 702 through 724, tracing the progress of messages through an application, such as application 600. The information recorded for each data entry may include an identifier 730 that identifies the message being processed, checkpoint information 732 (e.g., which checkpoint in the application the message has traversed) and timestamp information 734 based on when the checkpoint is traversed by a particular message.

A monitoring system may begin recording entries in data store 700 as messages M1 and M2 are received and processed by application 600. Again, a message traverses one or more of the checkpoints in an application as the message is processed by the application. Data entries are added, or appended, to the data store 700 as checkpoint information for different messages is collected and recorded by a monitoring system. For example, data entry 702 indicates that message M1 reached or traversed the checkpoint 602 at time 1 microsecond. Data entry 704 indicates that message M1 reached checkpoint 608 at time 1.5 microseconds, or 0.5 microseconds after reaching checkpoint 602. As indicated by data entry 706, message M2 traverses checkpoint 602 at time 3 microseconds, and so on as indicated in FIG. 7A. Thus, the data entries shown in data store 700 indicate the times that messages reached or traversed various checkpoints in the application. Each new data entry is appended to the end of the data store 700 in sequence as the data is collected. The application may accordingly process messages M1 and M2 concurrently, i.e., the messages are in different stages within the application, and the application has not completed processing any of those messages. The monitoring system concurrently logs data about in the same data store, interweaving data entries about different messages as the different messages reach the various checkpoints within the code.

After the application 600 completes processing messages M1 and M2, the latency detection system 508 within indexing system 500 may determine the message processing latencies associated with each stage. FIG. 7B illustrates example message processing latencies by stage for messages processed by an application. As shown in FIG. 7B, the latency detection system 508 may determine the actual latencies experienced by messages M1 and M2 as they were processed by the application 600. For example, the message processing latency for M1 through Stage 1 (defined by checkpoint pair 602, 608) may be determined as the timestamp for M1 traversing checkpoint 608 (1.5 microseconds) minus the timestamp for M1 traversing checkpoint 602 (1 microsecond), or 0.5 microseconds. Once all the message processing latencies for each stage are determined, each message processing latency, or the average of the message processing latencies for any one stage, is used to determine whether the associated checkpoint pair should be marked as delayed. As discussed above, the latency detection system 508 may use a variety of different techniques/delay conditions to determine if message processing through a stage was delayed.

The indexing system 500 then modifies the data store 700 by adding a special column 752, as shown in FIG. 7C. In particular, indexing system 500 adds a column 752 to the data store 700, i.e., an additional data field for each record therein.

It should be appreciated that each row in data store 700 includes a data entry associated a checkpoint. If a checkpoint in a data entry is part of a delayed checkpoint pair (as determined by the latency detection system 508), the indexing system marks a flag in the special column 752 for that checkpoint's data entry. For example, if the indexing system determines that message M2 experienced a delay in stage 3, then the two data entries (720 and 724) associated with the two checkpoints defining stage 3, namely, 618 and 624, and associated with message M2 are marked with a flag, indicated with an 'x', in column 752, as shown in FIG. 7C. The indexing system may similarly mark up any data entries associated with delayed checkpoint pairs as shown in FIG. 7C.

Accordingly, the indexing system modifies the data store 700 to include a special column 752. The timestamps of two different rows that are associated with the same stage are used to determine whether those two rows will include a flag in column 752.

If a performance analysis tool submits a query and requests that the query be limited to bottlenecked areas only, the data store searcher 506 only searches the rows that include flags in special column 752. For example, a user may query the data store 700 for messages that were processed between times 3 microseconds and 12 microseconds. If the query is not limited by the user to bottlenecked areas, the system returns rows 706, 708, 710, 712, 714, 716 and 718, or 7 rows. If, however, the query is limited by the user to bottlenecked areas, the system only returns rows 708, 714, and 718, or 3 rows. Moreover, the fields that are searched to arrive at those search results may also be drastically reduced. For example, without limiting the search results to just flagged rows, the entire data store, or 12 rows, may need to be searched. But if the search is limited to flagged rows, the starting point of the search may be only 6 rows, namely, rows 708, 714, 718, 720, 722 and 724. The disclosed indexing system accordingly enables a drastic improvement in the speed and efficiency with which a performance measurement database can be queried.

Figure 8:
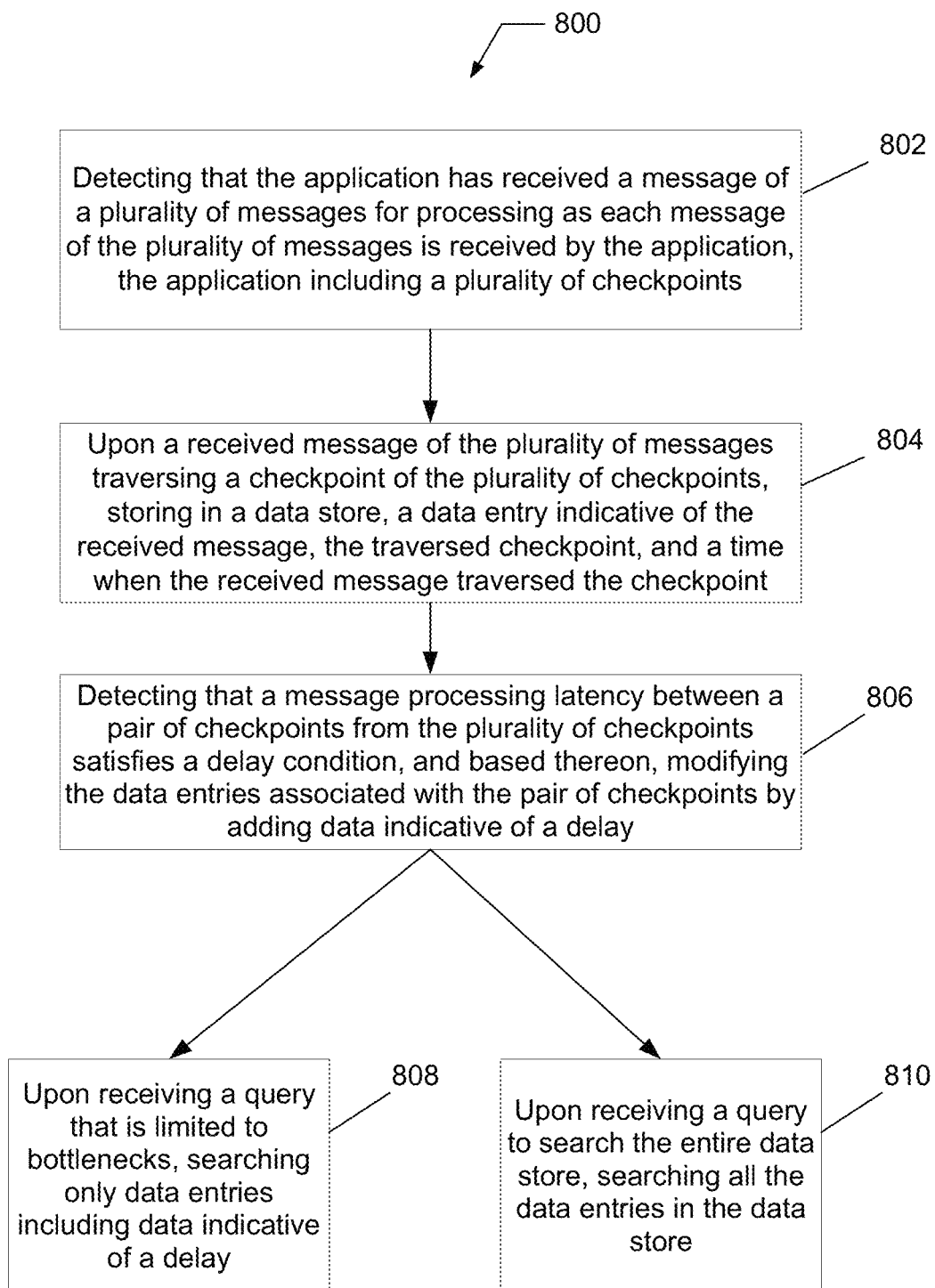
FIG. 8 depicts a high-level flowchart illustrating a method for indexing a data store, according to some embodiments.

FIG. 8 illustrates an example flowchart of a computer implemented method 800 of indexing a data store in a data transaction processing system. Embodiments may involve all, more or fewer actions than the illustrated actions. The actions may be performed in the order or sequence shown, or in a different sequence. The actions may be performed simultaneously, or in a parallel or overlapping fashion. The method may be performed by processing logic that may comprise hardware (circuitry, dedicated logic, etc.), software, or a combination of both. In one example, the method is performed by the computer system 100 of FIG. 1, while in some other examples, some or all of the method may be performed by another machine.

At step 802, method 800 includes detecting, by a processor coupled with the application, that the application has received a message of a plurality of messages for processing as each message of the plurality of messages is received by the application, the application including a plurality of checkpoints.

At step 804, method 800 includes, upon a received message of the plurality of messages traversing a checkpoint of the plurality of checkpoints, storing, by the processor, in a data store, a data entry indicative of the received message, the traversed checkpoint, and a time when the received message traversed the checkpoint.

At step 806, method 800 includes detecting, by the processor, that a message processing latency between a pair of checkpoints from the plurality of checkpoints satisfies a delay condition, and based thereon, modifying the data entries associated with the pair of checkpoints by adding data indicative of a delay. For example, a latency detection system may detect that one or more previously processed messages experienced a message processing latency when being processed from the portion of the code indicated by the first checkpoint in the pair of checkpoints to the portion of the code indicated by the second checkpoint in the pair of checkpoints. The processor, which may be part of the indexing system, may use the information provided by the latency detection system to mark checkpoints as delayed as discussed herein.

At step 808, method 800 includes, upon receiving, by the processor, a query that is limited to bottlenecks, searching, by the processor, only data entries including data indicative of a delay. For example, the processor may ignore all other data entries in the data store that do not include data indicative of a delay if the query is limited to bottlenecks/delays.

At step 810, method 800 includes, upon receiving, by the processor, a query to search the entire data store, searching, by the processor, all the data entries in the data store.

In one embodiment, the delay condition comprises one of: (i) the amount of time that elapses for a message to traverse the pair of checkpoints exceeds a threshold amount of time; (ii) the amount of time that elapses for a message to traverse the pair of checkpoints exceeds the amount of time that elapses for a message to traverse a different pair checkpoints; (iii) the amount of time that elapses for a message to be processed by a portion of the application defined by a pair of checkpoints is greater than an amount of time between new messages arriving at that portion of the application; or (iv) if a number of messages awaiting processing by a portion of the application defined by a pair of checkpoints exceeds a threshold number of messages.

A query that is limited to bottlenecks may be referred to as a bottleneck limited query. Because bottleneck limited queries may only search through data entries indicative of checkpoints marked as delayed, it should be appreciated that a bottleneck limited query is executed faster than a query to search all of the data entries in the data store.

Queries run the data store may include or comprise determining percentiles associated with message processing; (ii) determining message processing latency between a pair of checkpoints from the plurality of checkpoints over a specified timeframe.

In one embodiment, a data store may include data entries associated with the processing of more than one application. A query may request results for data entries processed by a particular application.

In one embodiment, detecting whether a message processing latency between a pair of checkpoints from the plurality of checkpoints satisfies a delay condition comprises determining an elapse of time between times when a received message traversed the two checkpoints in the pair of checkpoints. In one embodiment, the message processing latency between a pair of checkpoints from the plurality of checkpoints is determined based on data entries stored in the data store and indicative of times when a received message traversed the pair of checkpoints.

The indexing system may accordingly index the data in the data store during a post-processing phase and prepare the data to enable quicker and more efficient query responses. The indexing system may calculate, based on the logged data entries, message processing latencies for different stages within the application, which may include calculating the amount of time elapsed between a message traversing checkpoint pair. The indexing system may identify the checkpoints that are associated with bottlenecks in the application.

It should be appreciated that the monitoring system that collects data entries does not need to select which data entries are stored in the data store. A developer can add as many checkpoints as necessary to the application, where, at each checkpoint, a data entry is recorded in the data store. The indexing system can then determine which of the data entries are associated with delays, and when a user of a performance analysis tool limits a request to bottlenecks/delays, the indexing system limits the search to bottlenecks, as discussed herein. The indexing system accordingly enables a system to collect a large amount of data points, without having to search all of those data points in each query. Thus, the indexing system allows users to maintain a high level of configurability and flexibility as to what data is searched, without sacrificing the ability to run fast searches (e.g., by limiting the searches to bottlenecked/delayed checkpoints). The user could, for example, choose to run queries against both bottlenecked checkpoints, as well as all checkpoints, thus increasing the flexibility with which users can query the data store.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

While this specification contains many specifics, these should not be construed as limitations on the scope of the invention or of what may be claimed, but rather as descriptions of features specific to particular embodiments of the invention. Certain features that are described in this specification in the context of separate embodiments can also be implemented in combination in a single embodiment. Conversely, various features that are described in the context of a single embodiment can also be implemented in multiple embodiments separately or in any suitable sub-combination. Moreover, although features may be described as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings and described herein in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the described embodiments should not be understood as requiring such separation in all embodiments, and it should be understood that the described program components and systems can generally be integrated together in a single software product or packaged into multiple software products.

One or more embodiments of the disclosure may be referred to herein, individually and/or collectively, by the term "invention" merely for convenience and without intending to voluntarily limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, will be apparent to those of skill in the art upon reviewing the description.

The Abstract of the Disclosure is provided to comply with 37 C.F.R. § 1.72(b) and is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

It is therefore intended that the foregoing detailed description be regarded as illustrative rather than limiting, and that it be understood that it is the following claims, including all equivalents, that are intended to define the spirit and scope of this invention.

The invention claimed is:

1. A computer implemented method comprising:
evaluating, by a processor, a data store coupled therewith, the data store storing data indicative of a traversal of each of a plurality of messages via each of a plurality of checkpoints of an application operative to process the plurality of messages upon a receipt of each thereof, to determine that a traversal latency of one or more of the plurality of messages between at least two checkpoints of the plurality of checkpoints satisfies a delay condition, and based thereon, modify the data indicative of the traversal of at least one of the at least two checkpoints by the one or more messages to indicate a delay; and upon receiving, by the processor, a query of a first or second type, searching, by the processor based on the type of query, only data in the data store which indicates the delay when the query is of the first type or all of the data in the data store when the query is of the second type.

2. The computer implemented method of claim 1, wherein the delay condition comprises one of: (i) the amount of time that elapses for a message to traverse the at least two checkpoints exceeds a threshold amount of time; (ii) the amount of time that elapses for a message to traverse the at least two checkpoints exceeds the amount of time that elapses for a message to traverse a different at least two checkpoints; (iii) the amount of time that elapses for a message to be processed by a portion of the application defined by the at least two checkpoints is greater than an amount of time between new messages arriving at that portion of the application; or (iv) if a number of messages awaiting processing by a portion of the application defined by the at least two checkpoints exceeds a threshold number of messages.

3. The computer implemented method of claim 1, wherein the query of the first type is executed faster than the query of the second type.

4. The computer implemented method of claim 1, wherein the evaluating further comprises determining an elapse of time between times when a received message traversed at least two of the at least two checkpoints.

5. The computer implemented method of claim 1, wherein the traversal latency between the at least two checkpoints is determined based on the data stored in the data store indicative of the traversal of the one or more of the plurality of messages during the processing thereof of two or more of the plurality of checkpoints.

6. The computer implemented method of claim 1, wherein the application is a first application, and wherein the data store further includes data indicative of message processing by a second application.

7. The computer implemented method of claim 6, wherein the query of the first type comprises searching only the data indicative of the delay and indicative of messages processed by one of the first or second application.

8. The computer implemented method of claim 1, wherein the query comprises one or more of: (i) determining percentiles associated with message processing; and (ii) determining the traversal latency between at least two of the plurality of checkpoints over a specified period of time.

9. The computer implemented method of claim 1, wherein each message is an electronic data transaction request message, and wherein the application processes an electronic data transaction request message by determining whether an attempt to match an electronic data transaction request message with at least one previously received but unsatisfied electronic data transaction request message for a transaction which is counter thereto results in at least partial satisfaction of one or both of the electronic data transaction request message and the at least one previously received but unsatisfied electronic data transaction request message.

10. The computer implemented method of claim 1, wherein the evaluating occurs only after all of the plurality of messages have been processed by the application.

11. The computer implemented method of claim 1, wherein the query is received only after all of the plurality of messages have been processed by the application.

12. The computer implemented method of claim 1, wherein the at least two checkpoints are not consecutive.

13. The computer implemented method of claim 1, further comprising summarizing, by the processor, the result of the searching and presenting a visual representation thereof.

14. The computer implemented method of claim 13, wherein the visual representation comprises a timeseries and percentile distribution.

15. A computer implemented method comprising:
evaluating, by a processor, data indicative of the processing of each of a plurality of messages by an application which causes each of the plurality of message to traverse at least one of a plurality of checkpoints of the application to determine that a latency between at least two checkpoints of the plurality of checkpoints satisfies a delay condition, and based thereon, modify the data based thereon; and upon receiving, by the processor, a query of a first or second type, searching, by the processor based on the type of query, only the modified data or all of the data.

16. The computer implemented method of claim 15, wherein the delay condition comprises one of: (i) the amount of time that elapses for a message to traverse the at least two checkpoints exceeds a threshold amount of time; (ii) the amount of time that elapses for a message to traverse the at least two checkpoints exceeds the amount of time that elapses for a message to traverse a different pair checkpoints; (iii) the amount of time that elapses for a message to be processed by a portion of the application defined by at least two of the plurality of checkpoints is greater than an amount of time between new messages arriving at that portion of the application; or (iv) if a number of messages awaiting processing by a portion of the application defined by at least two of the plurality of checkpoints exceeds a threshold number of messages.

17. The computer implemented method of claim 15, wherein a search of only the modified data is executed faster than a search all of the data.

18. The computer implemented method of claim 15, wherein the query comprises one or more of: (i) determining percentiles associated with message processing; and (ii) determining message processing latency between a pair of checkpoints from the plurality of checkpoints over a specified timeframe.

19. The computer implemented method of claim 15, wherein the evaluating occurs only after all of the plurality of messages have been processed by the application.

20. The computer implemented method of claim 15, wherein the query is received only after all of the plurality of messages have been processed by the application.

21. The computer implemented method of claim 15, wherein the at least two checkpoints are not consecutive.

22. The computer implemented method of claim 15, further comprising summarizing, by the processor, the result of the searching and presenting a visual representation thereof.

23. The computer implemented method of claim 22, wherein the visual representation comprises a timeseries and percentile distribution.

24. A non-transitory computer-readable medium storing instructions which cause a processor to:
evaluate a data store coupled with the processor, the data store storing data indicative of a traversal of each of a plurality of messages via each of a plurality of checkpoints of an application operative to process the plurality of messages upon a receipt of each thereof, to determine that a traversal latency of one or more of the plurality of messages between at least two checkpoints of the plurality of checkpoints satisfies a delay condition, and based thereon, modify the data indicative of the traversal of at least one of the at least two checkpoints by the one or more messages to indicate a delay; and upon receipt, by the processor, of a query of a first or second type, search, by the processor based on the type of query, only data in the data store which indicates the delay when the query is of the first type or all of the data in the data store when the query is of the second type.

25. The non-transitory computer-readable medium of claim 24, wherein the delay condition comprises one of: (i) the amount of time that elapses for a message to traverse the at least two checkpoints exceeds a threshold amount of time; (ii) the amount of time that elapses for a message to traverse the at least two checkpoints exceeds the amount of time that elapses for a message to traverse a different pair checkpoints; (iii) the amount of time that elapses for a message to be processed by a portion of the application defined by the at least two checkpoints of the plurality checkpoints is greater than an amount of time between new messages arriving at that portion of the application; or (iv) if a number of messages awaiting processing by a portion of the application defined by the at least two checkpoints of the plurality of checkpoints exceeds a threshold number of messages.

26. The non-transitory computer-readable medium of claim 24, wherein the query of the first type is faster than the query of the second type.

27. The non-transitory computer-readable medium of claim 24, wherein the detection of whether the traversal latency between the at least checkpoints satisfies the delay condition comprises determining an elapse of time between times when the one or more messages traversed at least one of the at least two checkpoints.

28. The non-transitory computer-readable medium of claim 24, wherein the instructions are further configured to cause the processor to determine the traversal latency between the at least two checkpoints based on data stored in the data store and indicative of times when the one or more messages traversed the at least two checkpoints.

29. The non-transitory computer-readable medium of claim 24, wherein the query comprises one or more of: (i) a determination of percentiles associated with message processing; and (ii) a determination of the traversal latency between at least two of the plurality of checkpoints over a specified timeframe.

30. The non-transitory computer-readable medium of claim 24, wherein the evaluation occurs only after all of the plurality of messages have been processed by the application.

31. The non-transitory computer-readable medium of claim 24, wherein the query is received only after all of the plurality of messages have been processed by the application.

32. The non-transitory computer-readable medium of claim 24, wherein the at least two checkpoints are not consecutive.

33. The non-transitory computer-readable medium of claim 24, wherein the instructions are further configured to cause the processor to summarize the result of the search and present a visual representation thereof.

34. The non-transitory computer-readable medium of claim 33, wherein the visual representation comprises a timeseries and percentile distribution.

35. A computer system comprising:
means for evaluating a data store, which stores data indicative of a traversal of each of a plurality of messages via each of a plurality of checkpoints of an application operative to process the plurality of messages upon a receipt of each thereof, to determine that a traversal latency of one or more of the plurality of messages between at least two checkpoints of the plurality of checkpoints satisfies a delay condition, and based thereon, modify the data indicative of the traversal of at least one of the at least two checkpoints by the one or more messages to indicate a delay; and
upon receiving a query of a first or second type, means for searching, based on the type of query, only data in the data store which indicates the delay when the query is of the first type or all of the data in the data store when the query is of the second type.

* * * * *